United States Patent
Powers

(10) Patent No.: US 11,745,842 B1
(45) Date of Patent: Sep. 5, 2023

(54) DAMPER ASSEMBLIES AND MARINE PROPELLERS WITH DAMPER ASSEMBLIES

(71) Applicant: Charles S. Powers, Shreveport, LA (US)

(72) Inventor: Charles S. Powers, Shreveport, LA (US)

( * ) Notice: Subject to any disclaimer, the term of this patent is extended or adjusted under 35 U.S.C. 154(b) by 242 days.

(21) Appl. No.: 17/467,847

(22) Filed: Sep. 7, 2021

Related U.S. Application Data

(60) Provisional application No. 63/075,493, filed on Sep. 8, 2020.

(51) Int. Cl.
| | | |
|---|---|---|
| *B63H 1/20* | (2006.01) | |
| *F16D 3/76* | (2006.01) | |
| *F16D 3/12* | (2006.01) | |

(52) U.S. Cl.
CPC .............. *B63H 1/20* (2013.01); *F16D 3/12* (2013.01); *F16D 3/76* (2013.01); *F16D 2300/22* (2013.01)

(58) Field of Classification Search
CPC .......... B63H 20/14; B63H 1/15; B63H 23/34; B63H 1/20; F16D 9/08; F16D 9/06
See application file for complete search history.

(56) References Cited

U.S. PATENT DOCUMENTS

| | | |
|---|---|---|
| 2,326,450 A | 8/1943 | Fawick |
| 2,848,883 A | 8/1958 | Dall'Olio |
| 3,620,044 A | 11/1971 | Latour |
| 4,086,012 A | 4/1978 | Buckley et al. |
| 4,344,306 A | 8/1982 | Citron |
| 4,389,203 A | 6/1983 | Diintzen |
| 4,750,685 A | 6/1988 | Frei |
| 6,471,481 B2 * | 10/2002 | Chen ........................ B63H 1/20 416/170 R |
| 6,659,878 B2 * | 12/2003 | Anderson ............... F16B 33/02 244/54 |
| 6,685,432 B2 * | 2/2004 | Chen ...................... B63H 23/34 416/170 R |
| 7,086,836 B1 | 8/2006 | Sheth et al. |
| 7,223,073 B2 * | 5/2007 | Dean ........................ B63H 1/20 416/134 R |
| 7,578,744 B2 | 8/2009 | Park |
| 7,637,792 B1 * | 12/2009 | Davis ..................... B63H 23/02 416/169 R |
| 7,883,422 B2 | 2/2011 | Takamura et al. |
| 8,277,269 B1 | 10/2012 | Alby et al. |

(Continued)

*Primary Examiner* — Shafiq Mian
(74) *Attorney, Agent, or Firm* — R. Keith Harrison

(57) ABSTRACT

Damper assemblies suitable for coupling a drive to an output may include a hub for coupling to the output. The hub may include a hub drive sleeve. A drive adaptor may be configured for coupling to the drive. The drive adaptor may include an adaptor shaft disposed in the hub drive sleeve of the hub. At least one continuous circumferential damper member may encircle the adaptor shaft of the drive adaptor. The at least one circumferential damper member may be drivingly engaged by the adaptor shaft of the drive adaptor and drivingly engage the hub drive sleeve of the hub. At least one deformation space may be disposed adjacent to the at least one continuous circumferential damper member. The at least one deformation space may at least partially coincide in circumference with the at least one circumferential damper member. Marine propellers having damper assemblies are also disclosed.

31 Claims, 31 Drawing Sheets

(56) References Cited

U.S. PATENT DOCUMENTS

| | | |
|---|---|---|
| 10,336,418 B2 | 7/2019 | Kuroki |
| 10,533,615 B1 | 1/2020 | Powers |
| 2005/0186861 A1 | 8/2005 | Powers |

\* cited by examiner

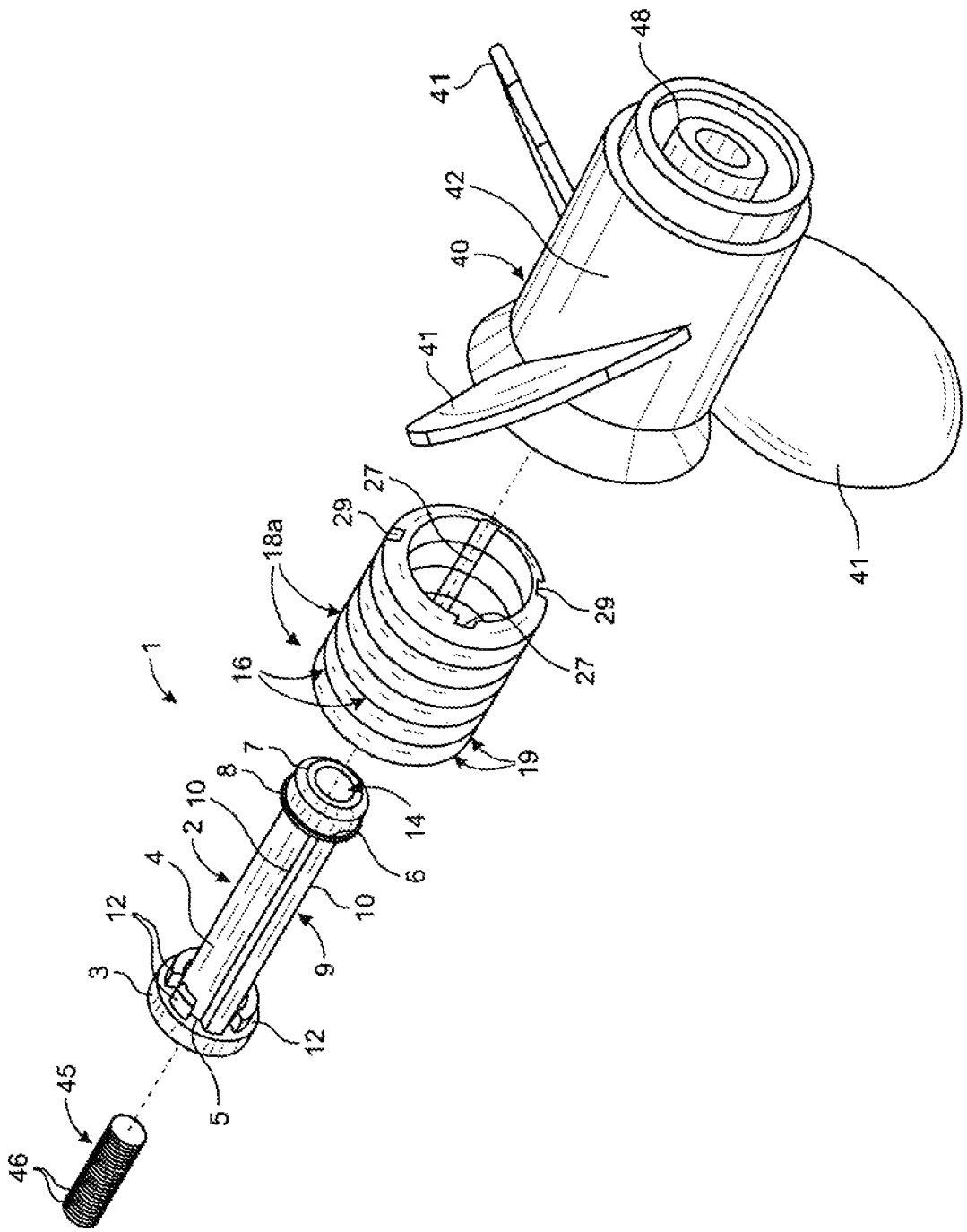

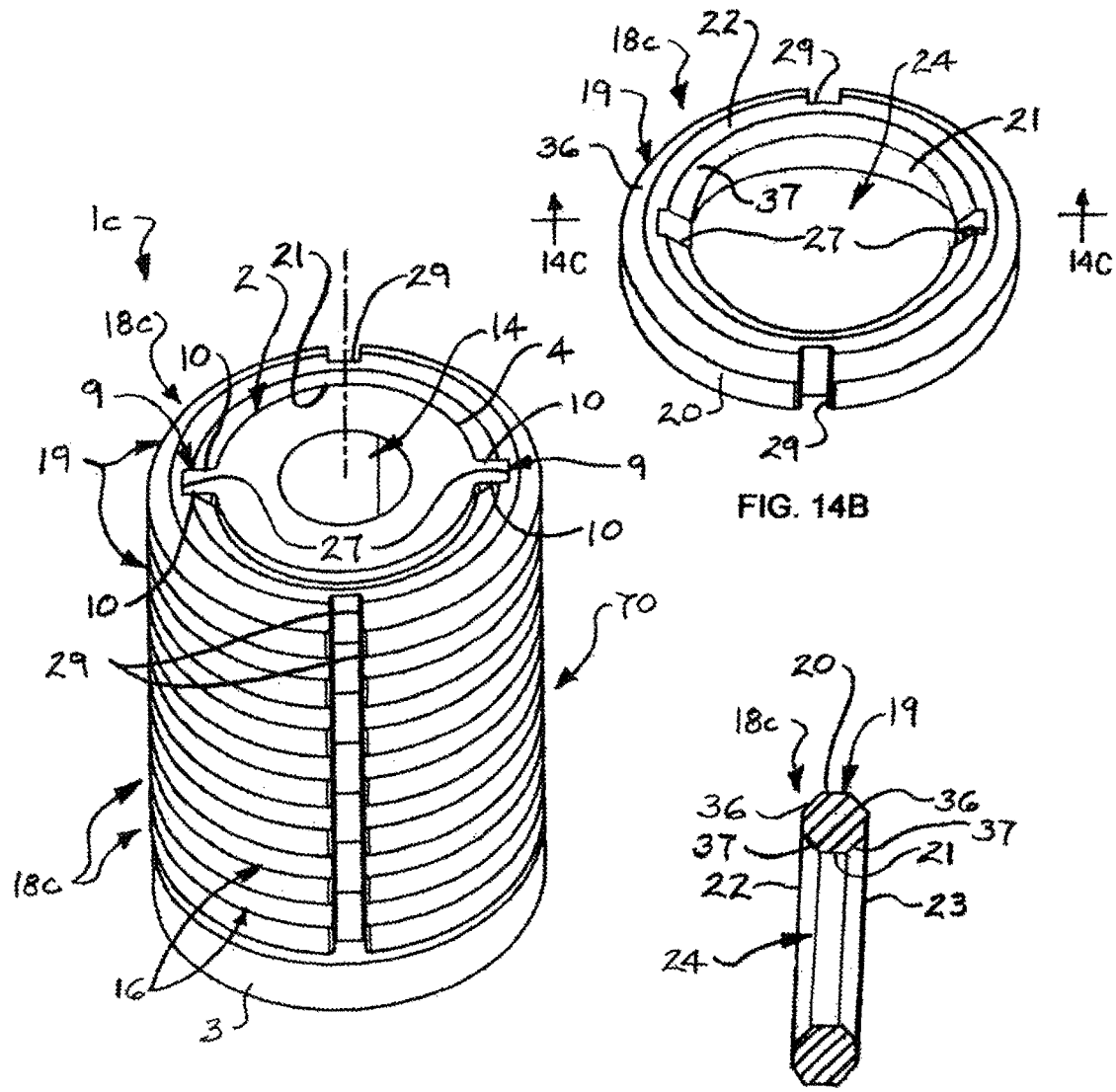
FIG. 14A
FIG. 14B
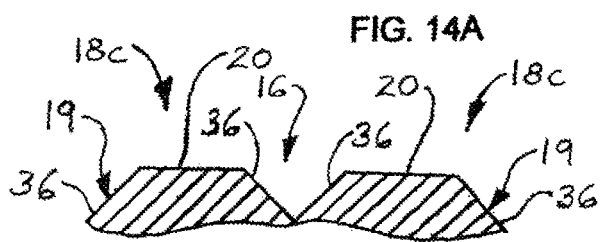
FIG. 14D
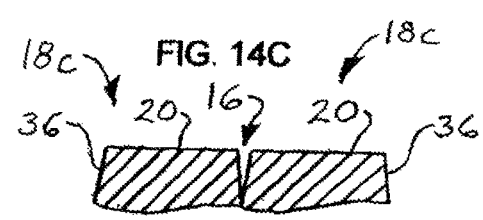
FIG. 14C
FIG. 14E

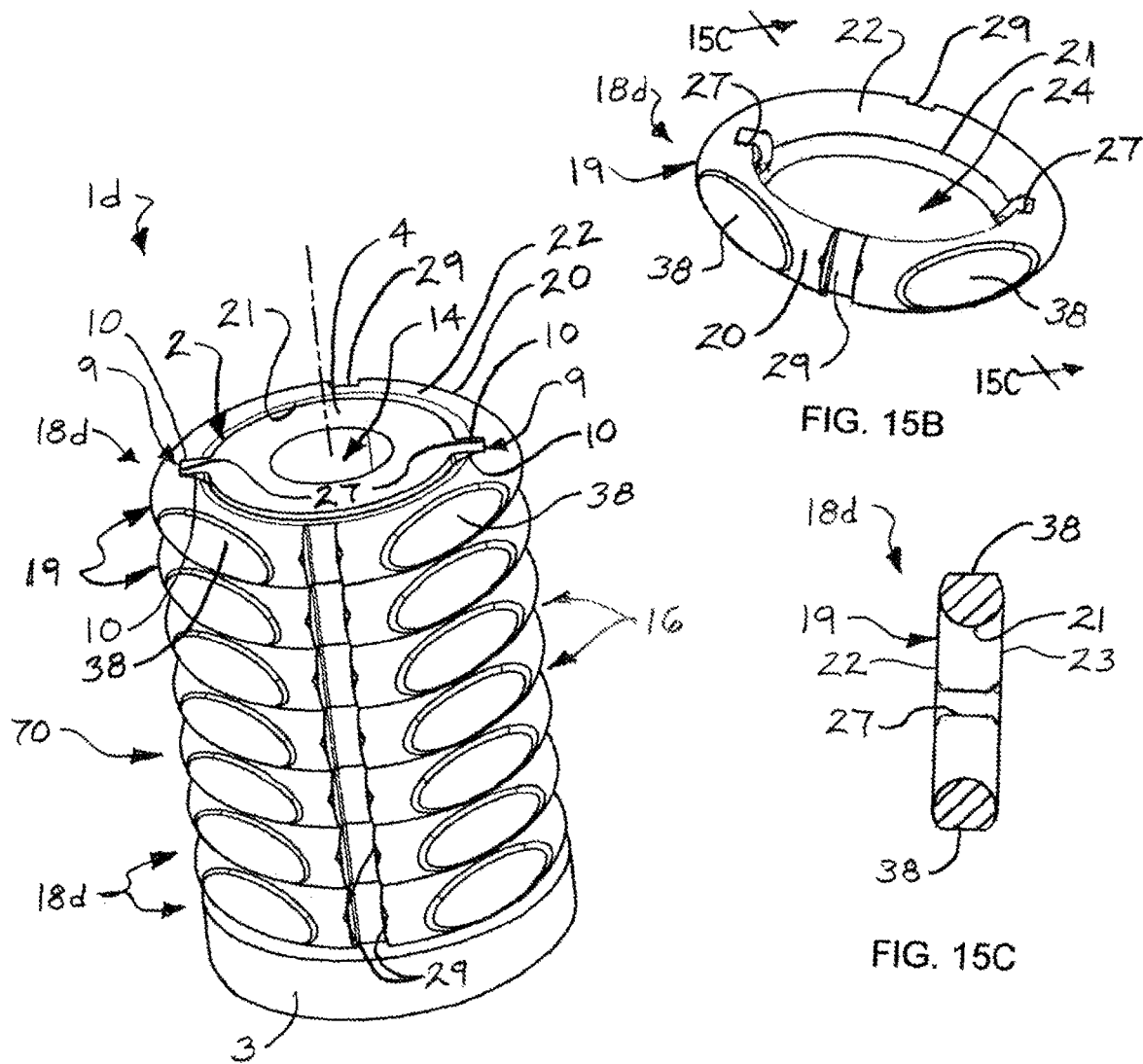
FIG. 15B
FIG. 15C
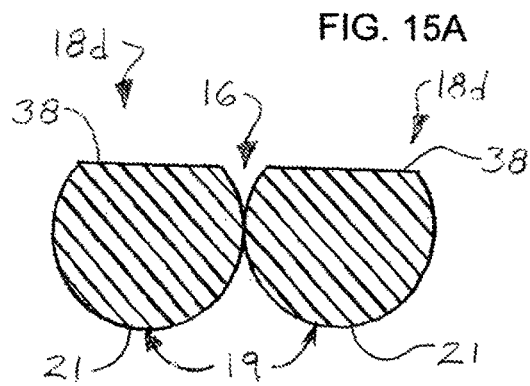
FIG. 15A
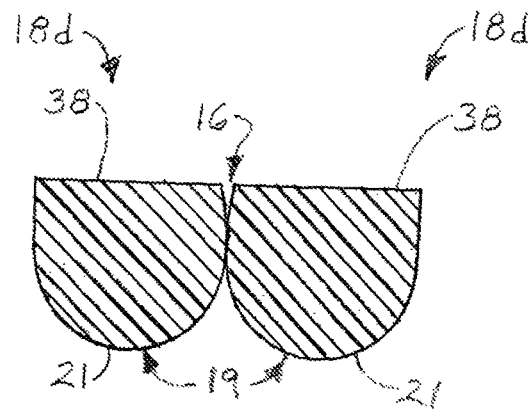
FIG. 15D
FIG. 15E

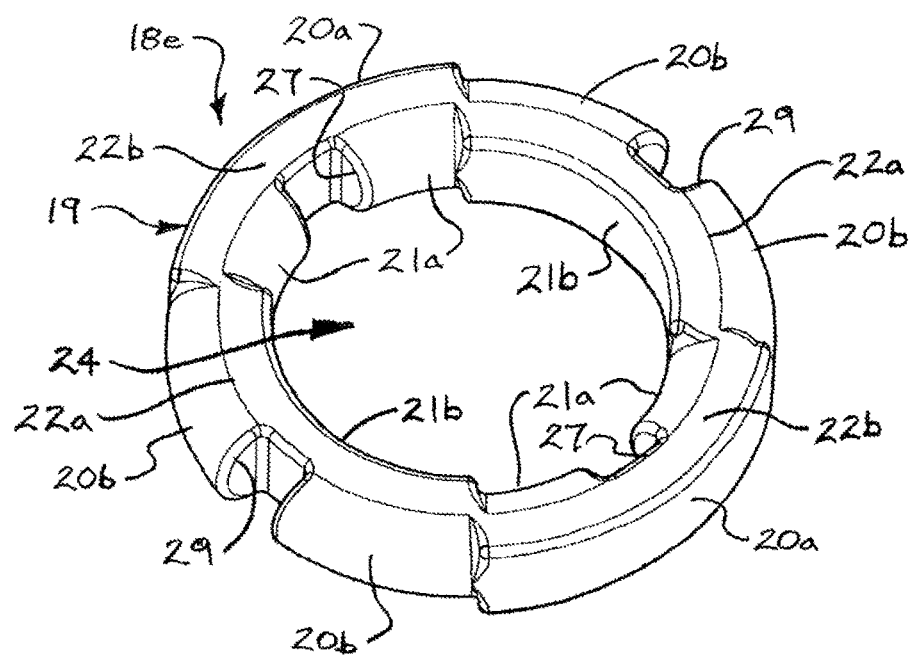
FIG. 16A
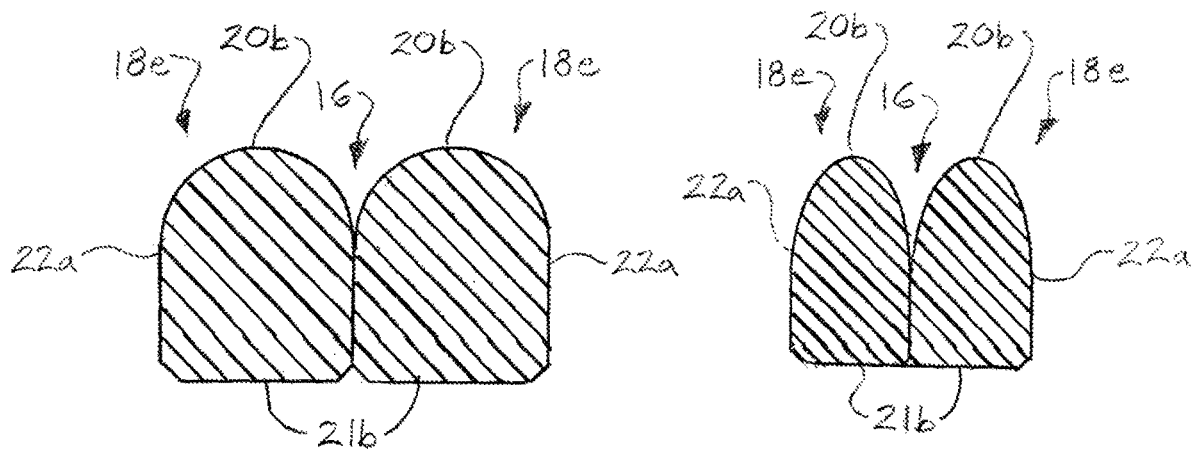
FIG. 16B
FIG. 16C

DAMPER ASSEMBLIES AND MARINE PROPELLERS WITH DAMPER ASSEMBLIES

CROSS-REFERENCE TO RELATED APPLICATIONS

This application claims the benefit of U.S. provisional application No. 63/075,493, filed Sep. 8, 2020, and entitled DAMPER ASSEMBLIES AND MARINE PROPELLERS WITH DAMPER ASSEMBLIES, which provisional application is hereby incorporated by reference herein in its entirety.

FIELD

Illustrative embodiments of the disclosure generally relate to coupling assemblies which transmit torque from a drive to an output. More particularly, illustrative embodiments of the disclosure relate to damper assemblies which may couple a marine propeller to a propeller drive shaft such that a selected resilience and torsional resistance of the propeller with respect to the drive shaft may be achieved for different applications of the propeller and may attenuate or dampen torsional forces transmitted from the propeller drive shaft to the marine propeller to reduce shock and impact sounds during gear changing or propeller striking events. The disclosure further relates to marine propellers having damper assemblies.

SUMMARY

Illustrative embodiments of the disclosure are generally directed to damper assemblies suitable for coupling a drive to an output. An illustrative embodiment of the damper assemblies may include a hub for coupling to the output. The hub may include a hub drive sleeve. A drive adaptor may be configured for coupling to the drive. The drive adaptor may include an adaptor shaft disposed in the hub drive sleeve of the hub. At least one circumferential damper member may extend continuously around the adaptor shaft of the drive adaptor. The at least one circumferential damper member may be drivingly engaged by the adaptor shaft of the drive adaptor and drivingly engage the hub drive sleeve of the hub for rotation. At least one deformation space may be disposed adjacent to the at least one circumferential damper member. The at least one deformation space may at least partially coincide in circumference with the at least one continuous circumferential damper member.

Illustrative embodiments of the disclosure are further generally directed to marine propellers. An illustrative embodiment of the marine propellers may include a damper assembly suitable for driving engagement by a propeller drive shaft. The damper assembly may include a propeller hub including a propeller hub drive sleeve. A plurality of propeller blades may extend from the propeller hub. A drive adaptor may be configured for coupling to the propeller drive shaft. The drive adaptor may include an adaptor shaft disposed in the hub drive sleeve of the propeller hub. At least one circumferential damper member may extend continuously around the adaptor shaft of the drive adaptor. The at least one circumferential damper member may be drivingly engaged for rotation by the adaptor shaft of the drive adaptor and drivingly engage the propeller hub drive sleeve of the propeller hub. At least one deformation space may be disposed adjacent to the at least one circumferential damper member. The at least one deformation space may at least partially coincide in circumference with the at least one circumferential damper member.

BRIEF DESCRIPTION OF THE DRAWINGS

Illustrative embodiments of the disclosure will now be described, by way of example, with reference to the accompanying drawings, in which:

FIG. 1 is an exploded front perspective view of an illustrative embodiment of the damper assemblies in a disassembled state and removed from a marine propeller;

FIG. 11C is a cross-sectional view of the circumferential damper members of the damper assembly illustrated in FIG. 10A, with the circumferential damper members deformed into the deformation space in the deformed, force-transmitting configuration of the damper assembly;

FIG. 14A is a perspective view of still another alternative illustrative embodiment of the damper assemblies with multiple truncated circumferential damper members deployed in place on the adaptor shaft of the drive adaptor and deformation spaces between the circumferential damper members;

FIG. 14B is a perspective view of a typical truncated circumferential damper member, removed from the drive adaptor;

FIG. 14C is a cross-sectional view, taken along section lines 14C-14C in FIG. 141B, of the truncated circumferential damper member:

FIG. 14D is an enlarged cross-sectional view of a pair of adjacent circumferential damper members of the damper assembly illustrated in FIG. 14A, more particularly illustrating a deformation space between the adjacent circumferential damper members in the relaxed configuration of the damper assembly;

FIG. 14E is a cross-sectional view of the circumferential damper members of the damper assembly illustrated in FIG. 14A, with the circumferential damper members deformed into the deformation space in the deformed, force-transmitting configuration of the damper assembly;

FIG. 15A is a perspective view of yet another alternative illustrative embodiment of the damper assemblies with multiple flat-surfaced circumferential damper members deployed in place on the adaptor shaft of the drive adaptor and deformation spaces between the circumferential damper members;

FIG. 15B is a perspective view of a typical flat-surfaced circumferential damper member, removed from the drive adaptor;

FIG. 15C is a cross-sectional view, taken along section lines 15C-15C in FIG. 15B, of the flat-surfaced circumferential damper member:

FIG. 15D is a cross-sectional view of a pair of adjacent circumferential damper members of the damper assembly illustrated in FIG. 15A, more particularly illustrating a deformation space between the adjacent circumferential damper members in the relaxed configuration of the damper assembly:

FIG. 15E is a cross-sectional view of the circumferential damper members of the damper assembly illustrated in FIG. 15A, with the circumferential damper members deformed into the deformation space in the deformed, force-transmitting configuration of the damper assembly:

FIG. 16A is a perspective view of another alternative circumferential damper member suitable for some embodiments of the damper assemblies;

FIG. 16B is a cross-sectional view of a pair of adjacent ones of the circumferential damper member illustrated in FIG. 16A, more particularly illustrating a deformation space between the adjacent circumferential damper members in the relaxed configuration, of the damper assembly;

FIG. 16C is a cross-sectional view of the pair of adjacent ones of the circumferential damper member illustrated in FIG. 16A, with the circumferential damper members deformed into the deformation space in the deformed, force-transmitting configuration of the damper assembly;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear", "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 21:
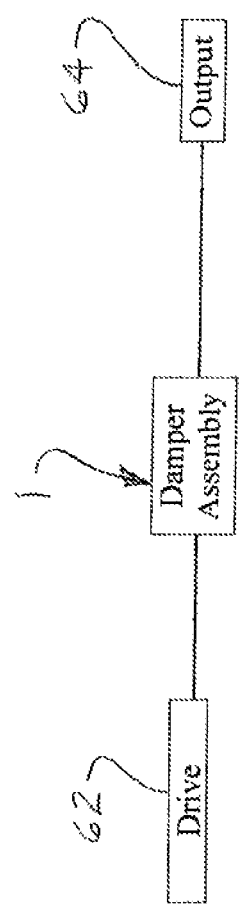
FIG. 21 is a block diagram which illustrates general application of the damper assemblies.

Referring initially to FIG. 21 of the drawings, an illustrative embodiment of the damper assemblies, hereinafter damper assembly, is generally indicated by reference numeral 1. The damper assembly 1 may be suitably adapted for coupling a drive 62 to an output 64. In some applications, the drive 62 may include an outboard boat motor (not illustrated) and the output 64 may include a marine or boat propeller 40 (FIG. 1). However, it will be recognized and understood that the damper assembly 1 may alternatively be used to couple the drive 62 to the output 64 in any rotary motion torque transmission application in which it is desired to achieve a selected resilience and torsional resistance of the output 64 relative to the drive 62 and is not limited to marine propeller applications.

Figure 9A:
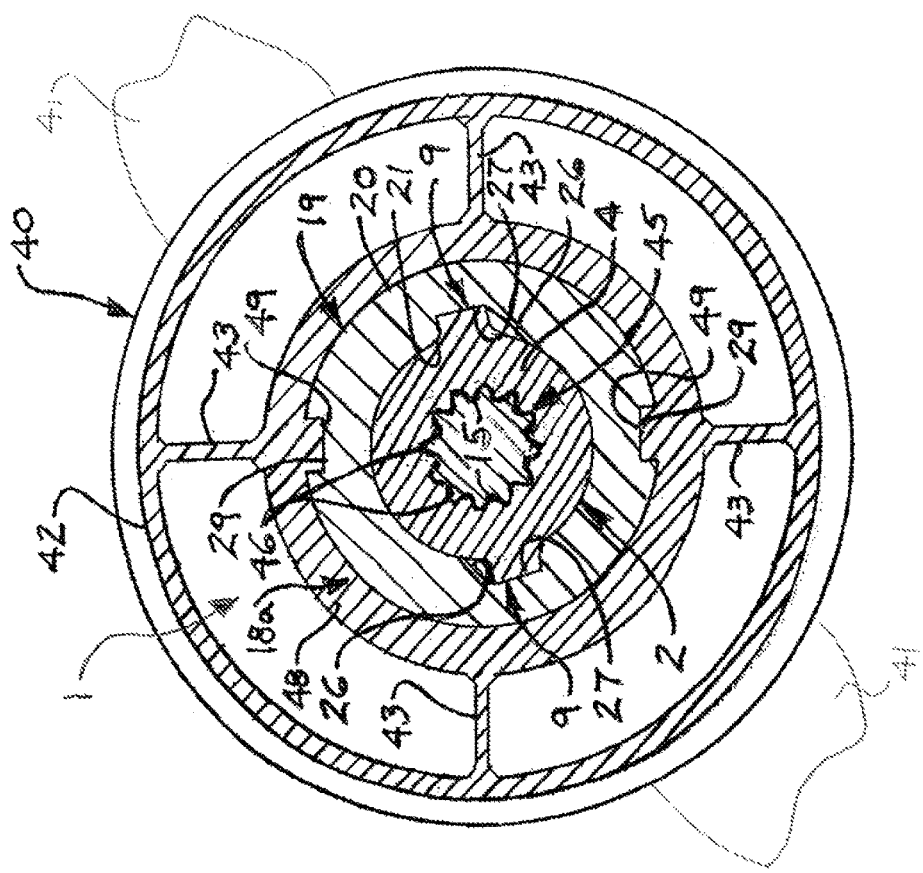
FIG. 9A is a cross-sectional view of the illustrative damper assembly in the assembled state in the propeller drive hub sleeve of the marine propeller, with the circumferential damper member of the damper assembly in a typical deformed, force-transmitting configuration.
Figure 8:
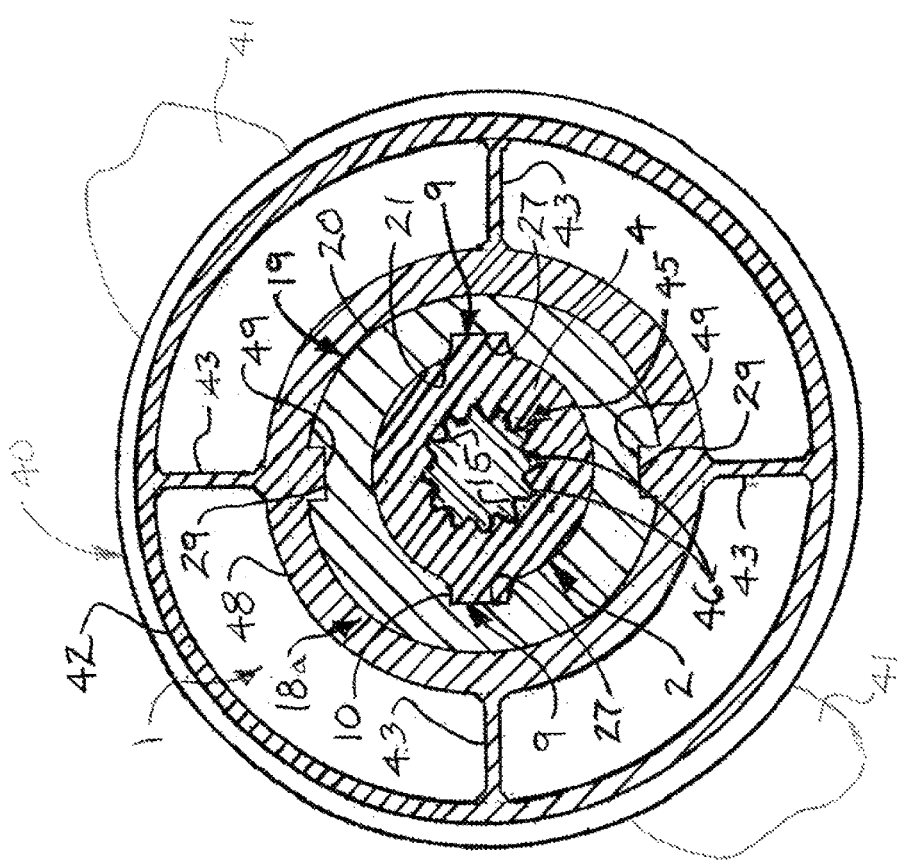
FIG. 8 is a cross-sectional view, taken along section lines 8-8 in FIG. 2B, of the illustrative damper assembly in the assembled state inside the propeller drive hub sleeve of the marine propeller with a circumferential damper member of the damper assembly in a relaxed configuration.
Figure 9B:
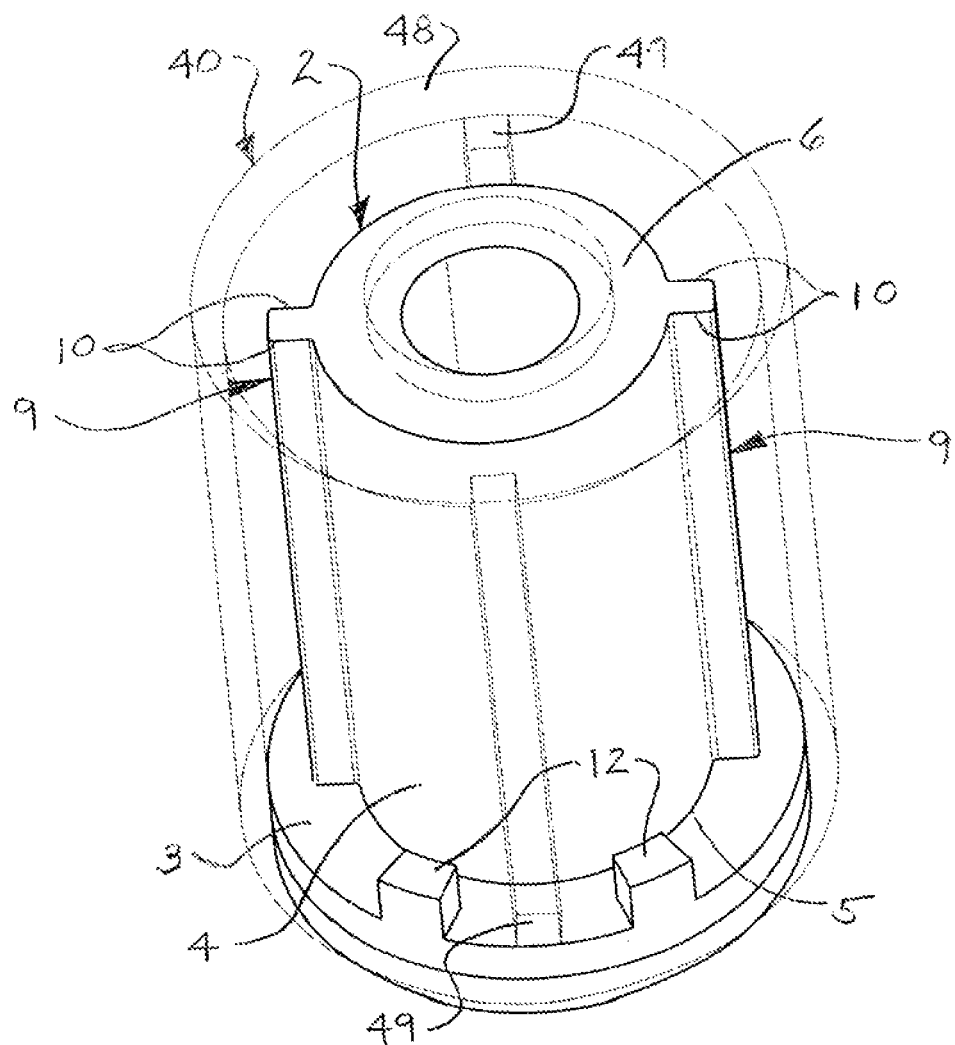
FIG. 9B is a perspective view of the drive adaptor deployed in place in the propeller hub drive sleeve of the marine propeller, with the propeller torque transfer lugs on the propeller hub drive sleeve disengaged from the drive stop lugs on the adaptor base of the drive adaptor and the circumferential damper members omitted for clarity.

Referring next to FIGS. 1-21 and 8-9B of the drawings, in some applications, the damper assembly 1 may drivingly couple a propeller drive shaft 45, typically provided with drive shaft splines 46 and drivingly engaged by an outboard boat motor (not illustrated), and a marine or boat propeller 40, having propeller blades 41 extending from a propeller hub 42. As illustrated in FIGS. 8-9B, a central propeller hub drive sleeve 48 may be disposed in the propeller hub 42 of the marine propeller 40. Multiple hub vanes 43 may extend between the propeller hub drive sleeve 48 and the propeller hub 42. At least one, and typically, a pair of propeller torque transfer lugs 49 may extend inwardly from the interior surface of the propeller hub drive sleeve 48 along at least a portion of the length of the propeller hub drive sleeve 48. In some embodiments, the propeller hub drive sleeve 48 and/or the propeller torque transfer lugs 49 of the marine propeller 40 may be wedge-shaped and may gradually narrow or taper from the aft end to the fore end of the propeller hub 22. In other embodiments, the propeller hub drive sleeve 48 and/or the propeller torque transfer lugs 49 may be non-tapered and uniform in width from the aft end to the fore end of the propeller hub 22.

As will be hereinafter further described, the damper assembly 1 may provide a selected torsional and longitudinal resistance between the propeller drive shaft 45 and the propeller hub 42 while imparting a selected resilience and progressive deformation and shear capability between those components to prevent or minimize damage to the propeller drive system during power surges and loads and in the event that one of the propeller blades 41 of the rotating propeller 40 inadvertently strikes a submerged object (not illustrated). The damper assembly 1 may additionally form a tensile spring 70 (FIG. 10A) which eliminates or reduces deadband or "play" between the propeller 40 and the propeller drive shaft 45 upon termination of torque applied to the propeller drive shaft 45, as well as attenuate or dampen torsional forces transmitted from the propeller drive shaft 45 to the marine propeller 40 to reduce shock and impact sounds during gear changing or propeller striking events.

Referring next to FIGS. 1, 2A and 3-7 of the drawings, the damper assembly 1 may include a drive adaptor 2. The drive adaptor 2 may include an adaptor base 3. An elongated adaptor shaft 4 may extend from the adaptor base 3. An adaptor cap 7 may terminate the adaptor shaft 4. The adaptor shaft 4 of the drive adaptor 2 may have an aft shaft end 5 at the adaptor base 3 and a fore shaft end 6 at the adaptor cap 7. A cap plate 8 may extend outwardly from the adaptor shaft 4 at the fore shaft end 6. In some embodiments, the adaptor shaft 4 may gradually taper or narrow from the aft shaft end 5 to the fore shaft end 6. In other embodiments, the adaptor shaft 4 may be non-tapering or straight from the aft shaft end 5 to the fore shaft end 6.

At least one adaptor lug 9 may extend outwardly from the adaptor shaft 4 of the drive adaptor 2. As illustrated in FIGS. 4-7, in some embodiments, a pair of spaced-apart adaptor lugs 9 may extend from the adaptor shaft 4 on opposite sides of the drive adaptor 2. The adaptor lugs 9 may be oriented in 180-degree relationship to each other on opposite sides of the adaptor shaft 4. Each adaptor lug 9 may extend at least a portion of the distance from the aft shaft end 5 to the fore shaft end 6 of the adaptor shaft 4 and may be continuous or discontinuous along its length, in some embodiments, each adaptor lug 9 may have a substantially uniform width from the aft shaft end 5 to the fore shaft end 6, as illustrated. Accordingly, each adaptor lug 9 may have a pair of opposite adaptor lug surfaces 10 which extend in substantially parallel, spaced-apart relationship to each other from the aft shaft end 5 to the fore shaft end 6. In other embodiments, the lug surfaces 10 of each adaptor lug 9 may have a substantially non-uniform or tapered width from the aft shaft end 5 to the fore shaft end 6. For example and without limitation, in some embodiments, each adaptor lug 9 may be wedge-shaped, gradually tapering or narrowing from the aft shaft end 5 to the fore shaft end 6. Accordingly, the adaptor lug surfaces 10 may gradually taper toward each other from the aft shaft end 5 to the fore shaft end 6 of the adaptor shaft 4.

Figure 2A:
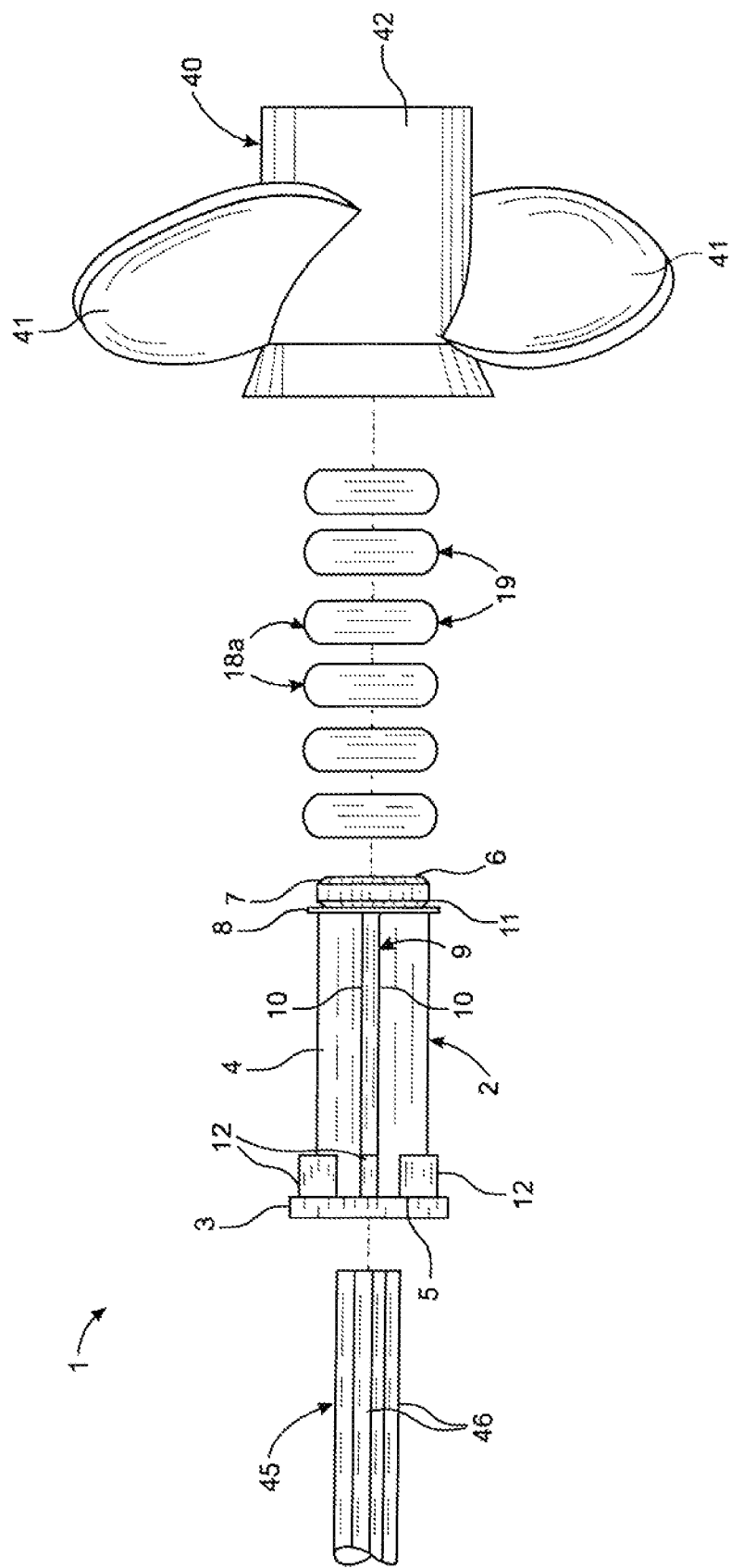
FIG. 2A is an exploded side view of the illustrative disassembled damper assembly and marine propeller illustrated in FIG. 1.
Figure 2B:
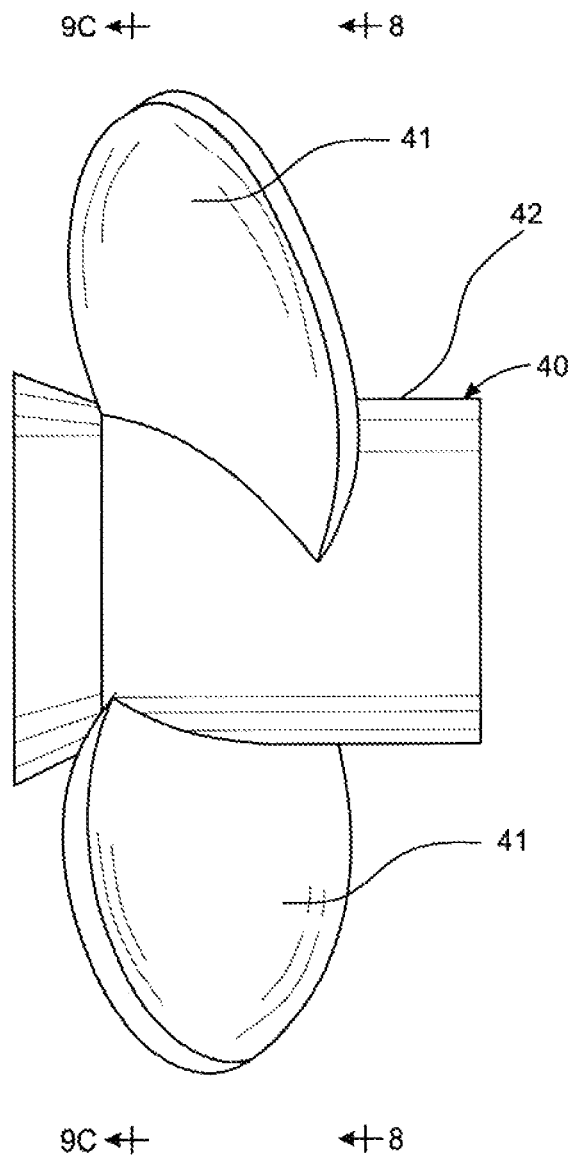
FIG. 2B is a side view of the marine propeller with the illustrative damper assembly (not illustrated) assembled inside the marine propeller.
Figure 3:
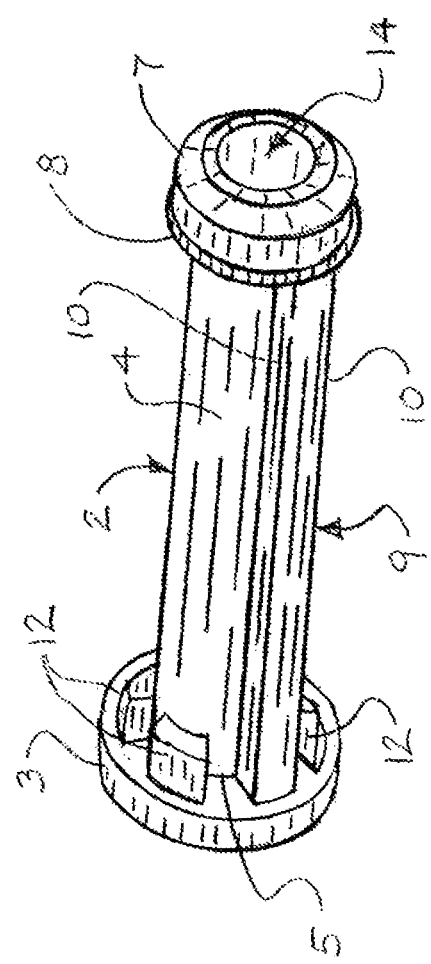
FIG. 3 is a front perspective view of a typical drive adaptor suitable for implementation of the illustrative damper assemblies.

As illustrated in FIG. 2A, in some embodiments, a cap groove 11 may be formed by and between the adaptor cap 7 and the cap plate 8 for purposes which will be hereinafter described. At least one drive stop lug 12 may extend forwardly from the adaptor base 3 typically along the adaptor shaft 4 of the drive adaptor 2 for purposes which will be hereinafter described.

Figure 6:
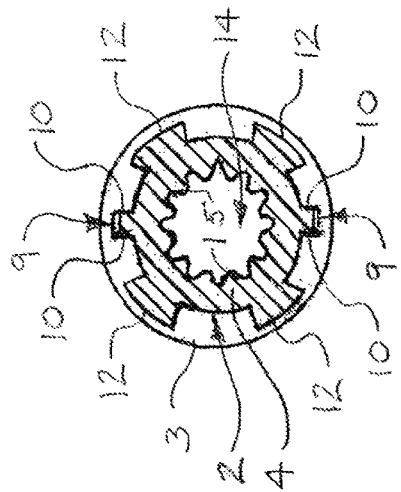
FIG. 6 is a cross-sectional view, taken along section lines 6-6 in FIG. 4, of the drive adaptor.
Figure 7:
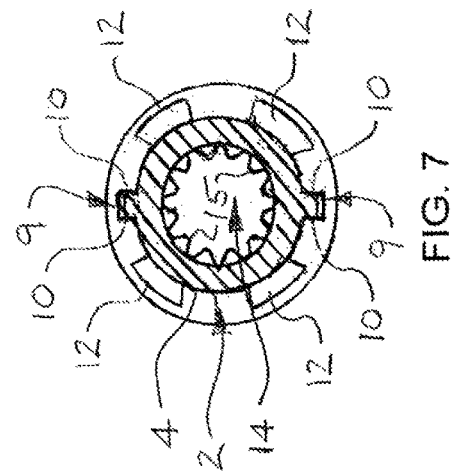
FIG. 7 is a cross-sectional view, taken along section lines 7-7 in FIG. 4, of the drive adaptor.
Figure 4:
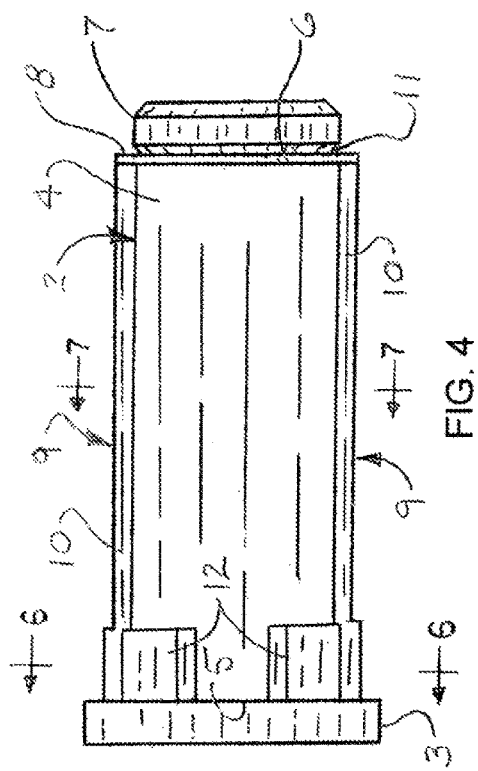
FIG. 4 is a side view of the drive adaptor illustrated in FIG. 3.
Figure 5:
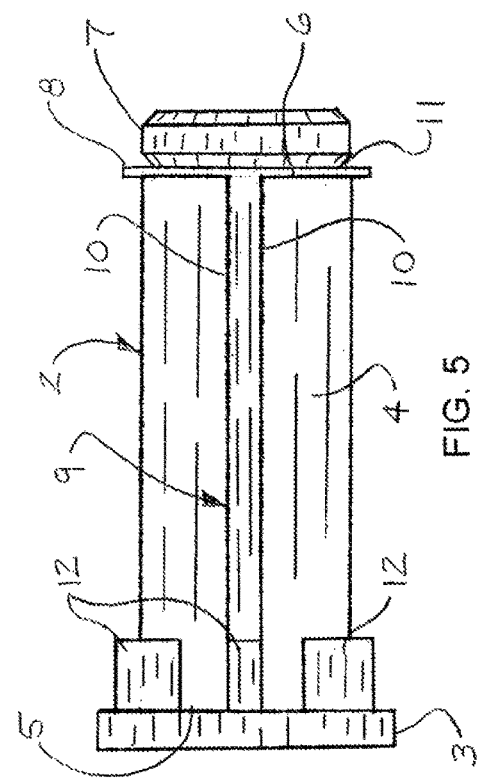
FIG. 5 is another side view of the drive adaptor illustrated in FIG. 3, rotated 90 degrees relative to the orientation shown in FIG. 4.

As illustrated in FIGS. 1, 3, 6 and 7, an adaptor bore 14 may traverse the adaptor base 3, the adaptor shaft 4 and the adaptor cap 7 of the drive adaptor 2. As illustrated in FIGS. 6 and 7, adaptor drive splines 15 may protrude from the interior surface of the adaptor bore 14 into the adaptor bore 14 along at least a portion of the length of the adaptor bore 14 for purposes which will be hereinafter described.

Referring next to FIGS. 1, 2A and 8-12C of the drawings, in the assembled damper assembly 1, at least one circumferential damper member 18a may be disposed on the adaptor shaft 4 between the adaptor base 3 and the cap plate 8 of the drive adaptor 2 in adjacent relationship to each other. As used herein, "circumferential" means that the circumferential damper member 18a extends completely around the adaptor shaft 4, irrespective of the circular, cylindrical, oval, polygonal or other shape of the circumferential damper member 18a. Accordingly, each circumferential damper member 18a may encircle or extend continuously and completely around the circumference or perimeter of the adaptor shaft 4 and may include a substantially non-elastomeric and incompressible material or an elastomeric or compressible material. Non-elastomeric and incompressible materials which are suitable for the purpose may include but are not limited to such materials as plastic, metal, wood, composite material or any combination thereof. Elastomeric or compressible materials which are suitable for the purpose may include but are not limited to rubber, plastic and/or composite material, for example and without limitation.

Figure 11A:
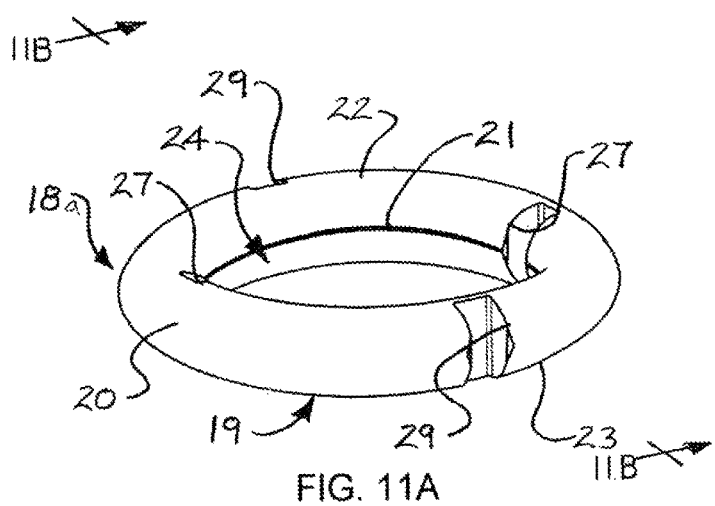
FIG. 11A is a perspective view of a typical toroid-shaped circumferential damper member of the illustrative damper assembly illustrated in FIG. 10A, removed from the adaptor shaft of the drive adaptor.
Figure 11B:
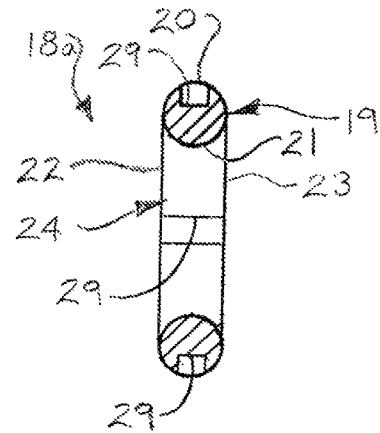
FIG. 11B is a cross-sectional view, taken along section lines 11B-11B in FIG. 11A, of the toroid-shaped circumferential damper member.

As illustrated in FIGS. 11A and 11B, in some embodiments, each circumferential damper member 18a may include a circumferential damper member body 19 having a damper opening 24. In some embodiments, the circumferential damper member body 19 may be continuous, annular and toroid-shaped and may be monolithic in construction with a circular cross-section (FIG. 1111). In some embodiments, the circumferential damper member body 19 may have an elliptical, oval, polygonal or other cross-sectional shape. In some embodiments, the toroid-shaped circumferential damper member body 19 may have a convex outer damper surface 20, a convex inner damper surface 21 facing the damper opening 24, a convex fore damper surface 22 and a convex aft damper surface 23.

Figure 9C:
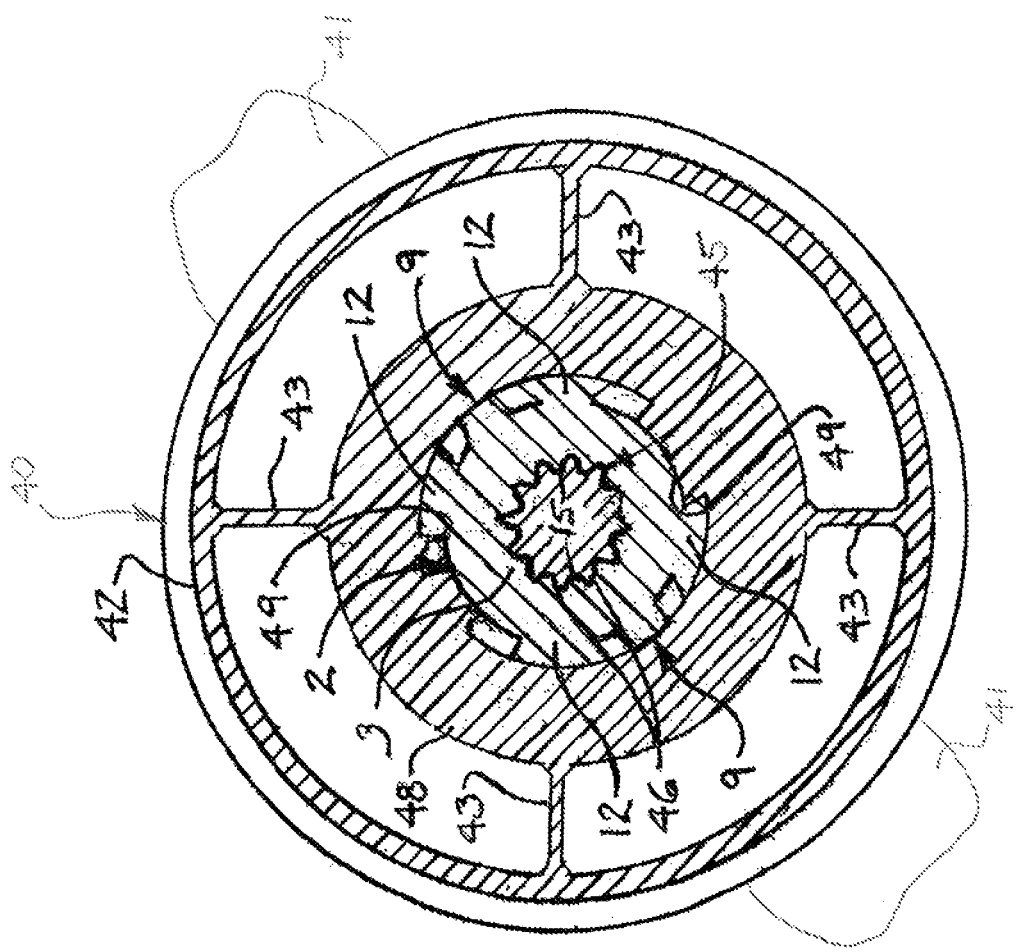
FIG. 9C is a cross-sectional view of the illustrative damper assembly in the assembled state, taken along section lines 8-8 in FIG. 2B, with the propeller torque transfer lugs on the propeller hub drive sleeve engaging the drive stop lugs on the adaptor base of the drive adaptor.
Figure 10A:
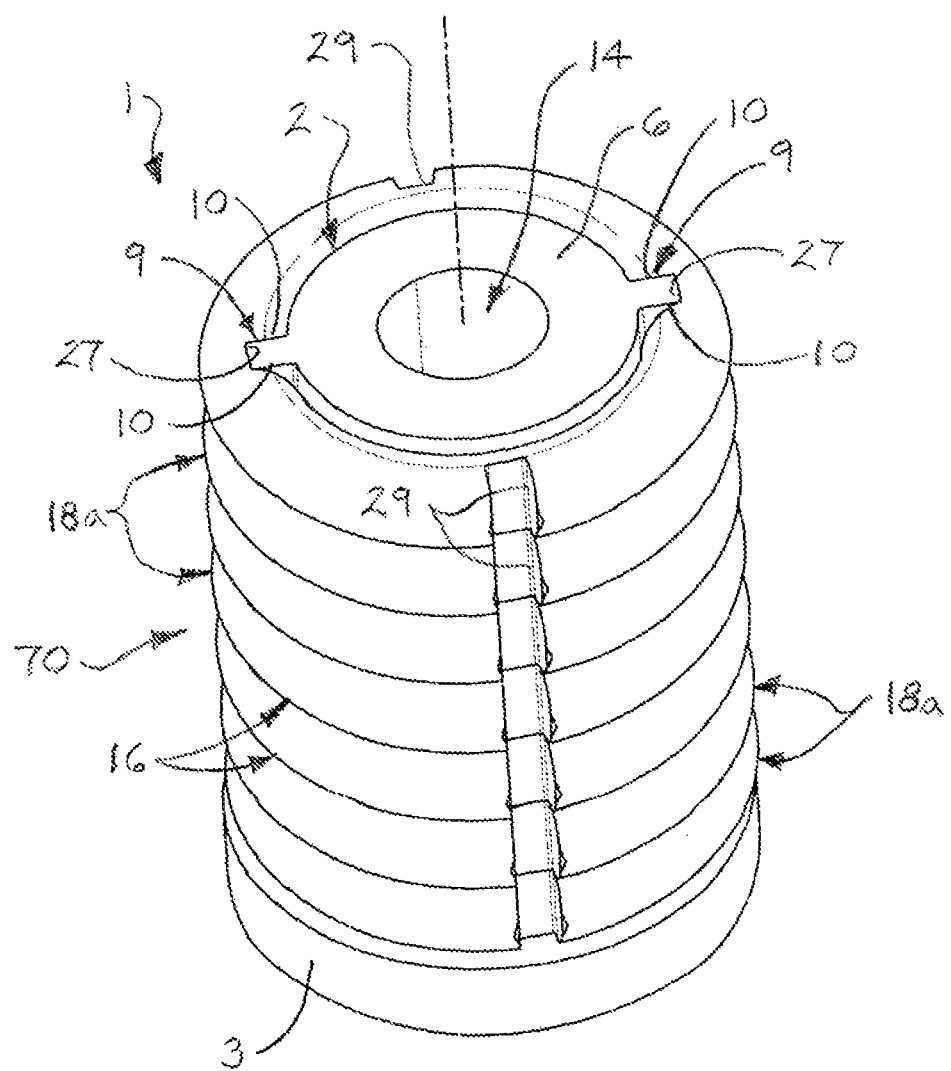
FIG. 10A is a perspective view of an illustrative embodiment of the damper assemblies with multiple, toroid-shaped circumferential damper members deployed in adjacent relationship to each other on the adaptor shaft of the drive adaptor and deformation spaces between the circumferential damper members.

As illustrated in FIGS. 10A, 11A and 11B, at least one internal adaptor lug notch 27 may extend into the inner damper surface 21 of the circumferential damper member body 19 of each circumferential damper member 18a. In some embodiments, a pair of circumferentially spaced-apart adaptor lug notches 27 may extend into the inner damper surface 21 on opposite sides of the damper opening 24, as illustrated. Each adaptor lug notch 27 may be suitably sized, configured and positioned to receive a corresponding adaptor lug 9 (FIGS. 8-9C) which extends outwardly from the adaptor shaft 4 of the drive adaptor 2.

At least one external transfer lug notch 29 may extend into the outer damper surface 20 of the circumferential damper member body 19. In some embodiments, a pair of circumferentially spaced-apart transfer lug notches 29 may extend into the outer damper surface 20. In some embodiments, the transfer lug notches 29 may be disposed in substantially 90-degree relationship with respect to the adaptor lug notches 27 along the circumference of the circumferential damper member body 19. Each transfer lug notch 29 may be suitably sized and configured to receive a corresponding propeller torque transfer lug 49 (FIGS. 8-9C) which extends inwardly from the interior surface of the propeller hub drive sleeve 48 of the marine propeller 40.

In deployment of each circumferential damper member 18a in place on or around the adaptor shaft 4 of the drive adaptor 2, as illustrated in FIG. 10A, the damper opening 24 may receive the adaptor shaft 4 with the inner damper surface 21 facing the exterior surface of the adaptor shaft 4, the fore damper surface 22 proximate the cap plate 8 and the aft damper surface 23 proximate the adaptor base 3. Each interior adaptor lug notch 27 in the inner damper surface 21 of the circumferential damper member body 19 may receive a corresponding adaptor lug 9 on the adaptor shaft 4 of the drive adaptor 2. Accordingly, the circumferential damper member 18a may extend continuously around the adaptor shaft 4. As the assembled damper assembly 1 is subsequently inserted into the propeller hub drive sleeve 48 of the marine propeller 40, as illustrated in FIGS. 8 and 9A, each exterior transfer lug notch 29 may receive a corresponding propeller torque transfer lug 49.

In typical assembly of the damper assembly 1, at least one circumferential damper member 18a may initially be deployed in place between the adaptor base 3 and the cap plate 8 of the drive adaptor 2 around the circumference of the adaptor shaft 4, as illustrated in FIG. 1. The adaptor bore 14 of the drive adaptor 2 may receive the propeller drive shaft 45, with the drive shaft splines 46 thereof engaging the internal adaptor drive splines IS of the drive adaptor 2, as illustrated in FIGS. 8-9C. The drive adaptor 2 may be inserted into the propeller hub drive sleeve 48 of the propeller hub 42 with the adaptor lugs 9 on the adaptor shaft 4 typically oriented in 90-degree relationship to the propeller torque transfer lugs 49 on the propeller hub drive sleeve 48, as illustrated in FIGS. 8 and 9B. Accordingly, the circumferential damper members 18a may be interposed between the convex arcuate outside surface of the adaptor shaft 4 and the concave arcuate inside surface of the propeller hub drive sleeve wall 48 of the propeller hub 42, as well as between the adjacent adaptor lugs 9 of the drive adaptor 2 and the interfacing adjacent or consequent propeller torque transfer lugs 49 of the propeller hub drive sleeve 48. Thus, the damper assembly 1 may attenuate or dampen torsional forces transmitted from the propeller drive shaft 45 to the marine propeller 40 to reduce shock and impact sounds during gear changing or propeller striking events. Additionally, the circumferential damper members 18a may form the tensile spring 70 (FIG. 12A) which, upon termination of torque applied to the propeller drive shaft 45 and drive adaptor 2, may eliminate or reduce deadband or "play" between the propeller 40 and the propeller drive shaft 45.

Figure 10C:
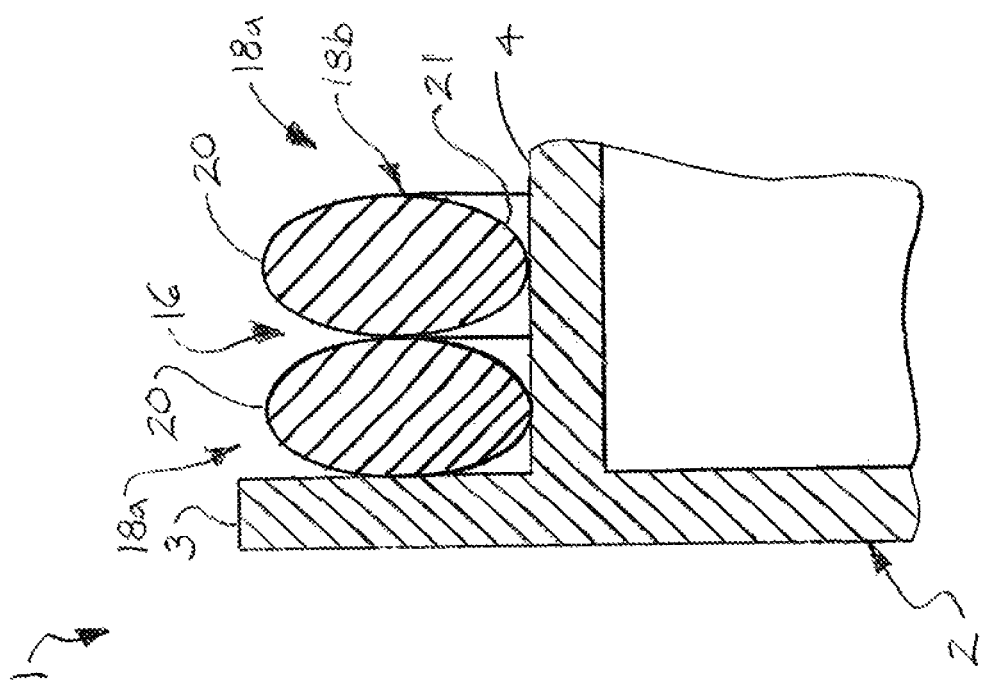
FIG. 10B is a cross-sectional view of a pair of adjacent circumferential damper members of the damper assembly illustrated in FIG. 10A, more particularly illustrating a deformation space between the adjacent circumferential damper members in the relaxed configuration of the damper assembly.
Figure 10B:
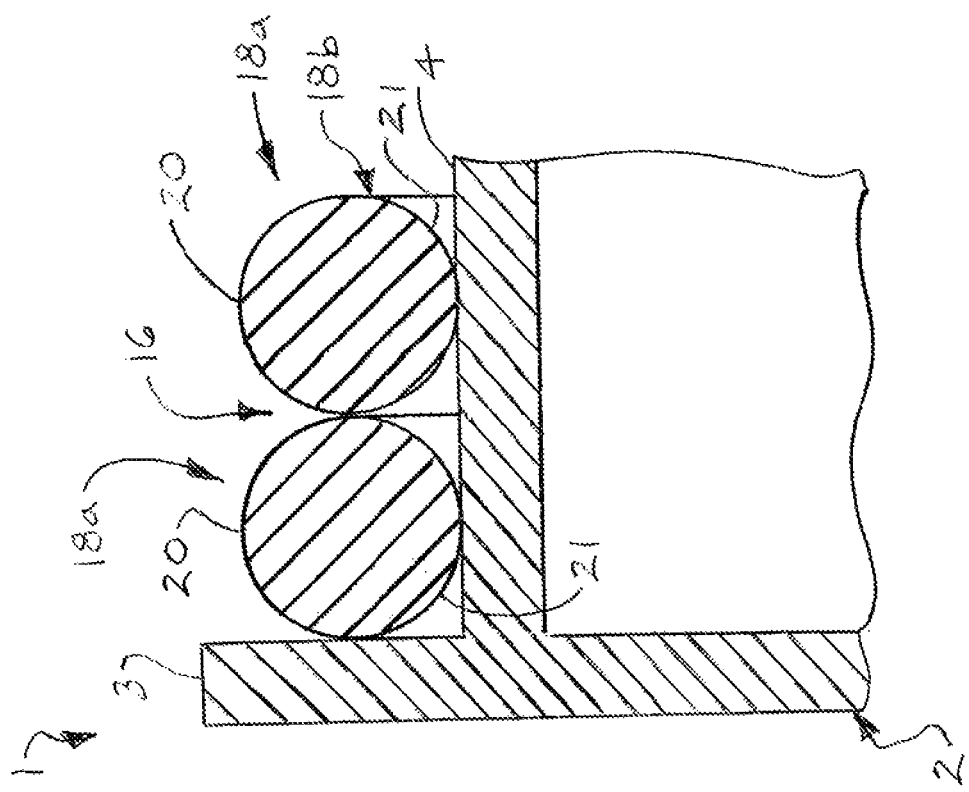

As illustrated in FIGS. 10A-10C, at least one deformation space 16 may be formed by and between each pair of adjacent circumferential damper members 18a. Each deformation space 16 may at least partially coincide in circumference with the circumference of the circumferential damper members 18a. In some embodiments, each deformation space 16 may extend along a continuous and uninterrupted course between the adjacent circumferential damper members 18a. In other embodiments, each deformation space 16 may be intermittent or discontinuous as it extends adjacent to the circumference of the circumferential damper members 18a.

In the relaxed configuration of the damper assembly 1, as illustrated in FIG. 10B, each deformation space 16 may have a maximal cross-sectional width or volume between the adjacent circumferential damper members 18a. In the deformed, force-transmitting configuration of the damper assembly 1, in which the drive adaptor 2 applies a rotational force to the marine propeller 40 through the damper assembly 1, as illustrated in FIG. 10C, each deformation space 16 may become circumferentially or perimetrically loaded as the circumferential damper members 18a extend into the deformation spaces 16 and the deformation spaces 16 accommodate the compressed circumferential damper members 18a. Accordingly, the deformation-absorbing capacity of the deformation spaces 16 in the damper assembly 1 may enhance the shock-absorbing and impact-sound absorbing capacity of the damper assembly 1 between the drive adaptor 2 and the marine propeller 40 during gear changing or propeller striking events.

Referring again to FIGS. 8-9C of the drawings, in typical operation of the damper assembly 1, as the rotating propeller drive shaft 45 applies a torque load to the drive adaptor 2, the adaptor shaft 4 of the drive adaptor 2 may rotate in the counterclockwise direction in FIG. 9A. Accordingly, each adaptor lug 9 of the drive adaptor 2 may apply torsion against the circumferential damper member body 19 of each circumferential damper member 18a at each corresponding adaptor lug notch 27. The circumferential damper member body 19 of each circumferential damper member 18a may in turn apply torsion against the propeller torque transfer lugs 49 on the propeller hub drive sleeve 48 at the respective transfer lug notches 29. Consequently, the circumferential damper member body 19 of each circumferential damper member 18a may be compressed between each adaptor lug 9 of the drive adaptor 2 and the adjacent propeller torque transfer lug 49 of the propeller hub drive sleeve 48. As illustrated in FIG. 9A, typically depending on the material or materials of construction of each circumferential damper member 18a, a deformation cavity 26 may form at the trailing portion or wall of each adaptor lug notch 27 at the point where the adaptor lug 9 pushes against the leading portion or wall of the adaptor lug notch 27. The circumferential damper members 18a may collectively transmit torsion from the adaptor lugs 9 to the propeller torque transfer lugs 49 to rotate the propeller 40. As illustrated in FIG. 10I, the circumferential damper members 18a may deform minimally or not at all into the adjacent deformation spaces 16 typically depending on such factors as the magnitude of the torque load and the material or materials of construction of the circumferential damper members 18a.

In the event of sudden gear changes or power surges at start-up, or if one or more of the propeller blades 41 strikes an underwater obstacle (not illustrated), rotation of the propeller hub 42 may suddenly slow or stop as the adaptor shaft 4 of the drive adaptor 2 continues to be rotated by the propeller drive shall 44. Consequently, rotation of the propeller torque transfer lugs 49 on the propeller hub drive sleeve 48 may substantially slow down or stop as the adaptor lugs 9 on the adaptor shaft 4 continue counterclockwise rotation with the drive adaptor 2, and the circumferential damper members 18a may be collectively sheared as the compressive torque load generated between the slow or stationary propeller torque transfer lugs 49 and the still rotating adaptor lugs 9 increases. Accordingly, the circumferential damper members 18a may or may not shear, depending typically upon the material or materials of construction of the circumferential damper members 18a, the magnitude of the torque load or shock between the drive adaptor 2 and the propeller drive shaft 45 and whether the propeller 40 disengages the submerged obstacle. Typically, the circumferential damper members 18a may not be completely sheared to provide continued driving engagement of the propeller drive shaft 45 with the propeller 40 and facilitate sustained rotation and driving operation of the submerged propeller 40 in the water. The sheared or damaged circumferential damper members 18a can subsequently be easily replaced for continued operation of the marine propeller 40 by removing the adaptor shaft 4 of the drive adaptor 2 from the propeller hub drive sleeve 48, removing the sheared or damaged circumferential damper members 18a from the drive adaptor 2, positioning replacement circumferential damper members 18a on the drive adaptor 2, and re-inserting the adaptor shall 4 of the drive adaptor 2 in the propeller hub drive sleeve 48.

As illustrated in FIG. 10C, the circumferential damper members 18a may compress into the deformation spaces 16 therebetween, thereby enhancing the shock-absorbing and impact-sound absorbing capacity of the damper assembly 1 between the drive adaptor 2 and the marine propeller 40 during gear changing or propeller striking events.

As the structural integrity of the circumferential damper members 18a remains intact and the circumferential damper members 18a engage the propeller torque transfer lugs 49 throughout rotation of the propeller 40, the adaptor lugs 9 on the drive adaptor 2 may remain disposed between and in spaced-apart relationship to the propeller torque transfer lugs 49 on the propeller hub drive sleeve 48 of the propeller 40, as illustrated in FIG. 9B (in which the circumferential damper members 18a are omitted for clarity). In the event that the circumferential damper members 18a are sheared, the drive stop lugs 12 on the adaptor base 3 of the drive adaptor 2 may rotate into engagement with the respective propeller torque transfer lugs 49 on the propeller hub drive sleeve 48, as illustrated in FIG. 9C, to maintain a driving connection between the propeller drive shaft 45 and the propeller 40 and prevent the vessel on which the propeller 40 is mounted from becoming stranded on a body of water.

It will be appreciated by those skilled in the art that the circumferential damper members 18a of the damper assembly 1 can be constructed using plastic, rubber, metal, wood, composite material and/or of any selected resilience, porosity or hardness, cross-sectional configuration and length, to achieve a selected resilience and torsional, as well as longitudinal resistance between the propeller drive shaft 45 and the propeller 40. Circumferential damper members 18a having different materials and torsional resistances may be placed on the drive adaptor 2 in various combinations depending on the desired overall torsional resistance between the propeller drive shaft 45 and the marine propeller 40. Moreover, any desired number of the circumferential damper members 18a may be placed on the adaptor shaft 4 of the drive adaptor 2 to achieve the desired torsional and longitudinal resistance. It is understood that the circumferential damper member body 19 of each circumferential damper member 18a can be constructed in any desired cross-sectional shape, including but not limited to polygonal, as will be hereinafter further described, and the resilience and torsional resistance can further be modified, as desired, by varying the longitudinal width or thickness of the circumferential damper member body 19, with greater thicknesses increasing the torsional and longitudinal resistance and decreasing the resilience, and smaller thicknesses decreasing the torsional and longitudinal resistance and increasing the resilience.

Referring again to FIG. 10A, it will be further appreciated by those skilled in the art that any desired number and combination of the circumferential damper members 18a of selected resilience and composition can be provided on the adaptor shaft 4 between the adaptor base 3 and the cap plate 8 to achieve the desired torsional resistance and resilience. While rubber circumferential damper members 18a can be any selected hardness, typical hardness for the rubber compression circumferential damper members 18a is in the range 50-90 duro rubber. In some embodiments, the rubber circumferential damper members 18a may also be hollow and at least partially filled with a compressed gas such as air to vary the resistance to shear.

Figure 12A:
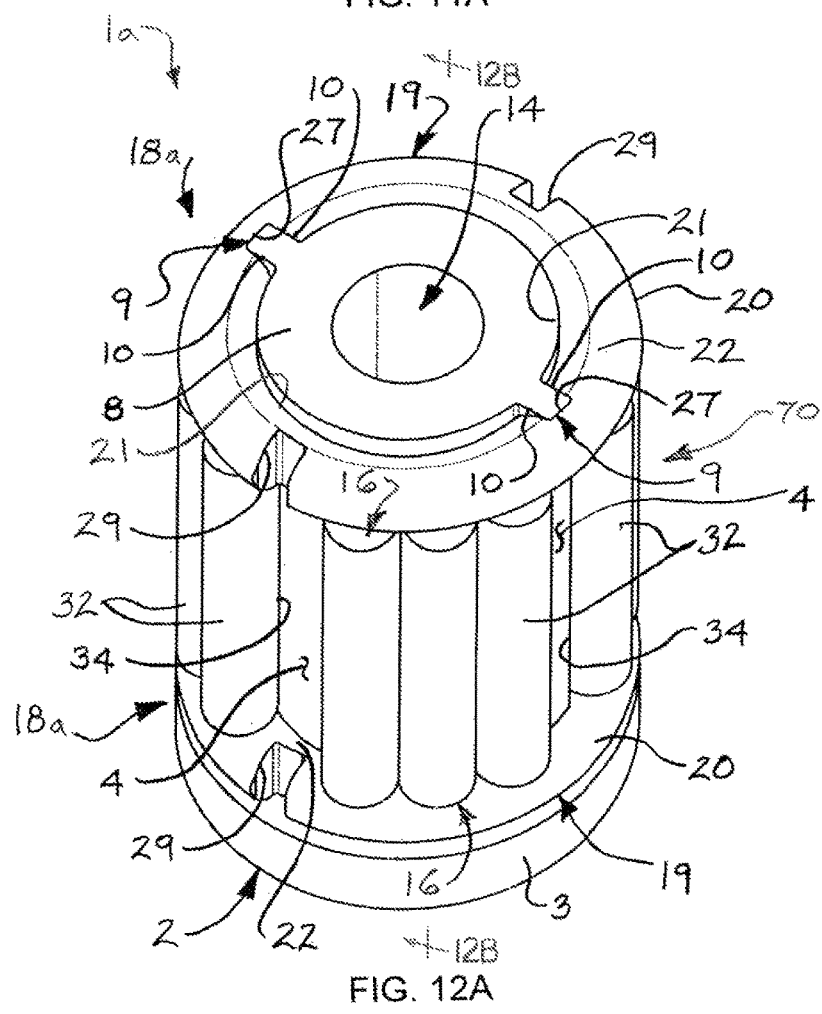
FIG. 12A is a perspective view of an alternative illustrative embodiment of the damper assemblies with a pair of the toroid-shaped circumferential damper members deployed in place at the respective fore and aft ends of the adaptor shaft of the drive adaptor and a selected number of multiple longitudinal damper members deployed in place around the adaptor shaft and extending in parallel relationship to each other between the toroidal circumferential damper members and a deformation space between the longitudinal damper members and each corresponding circumferential damper member.
Figure 12C:
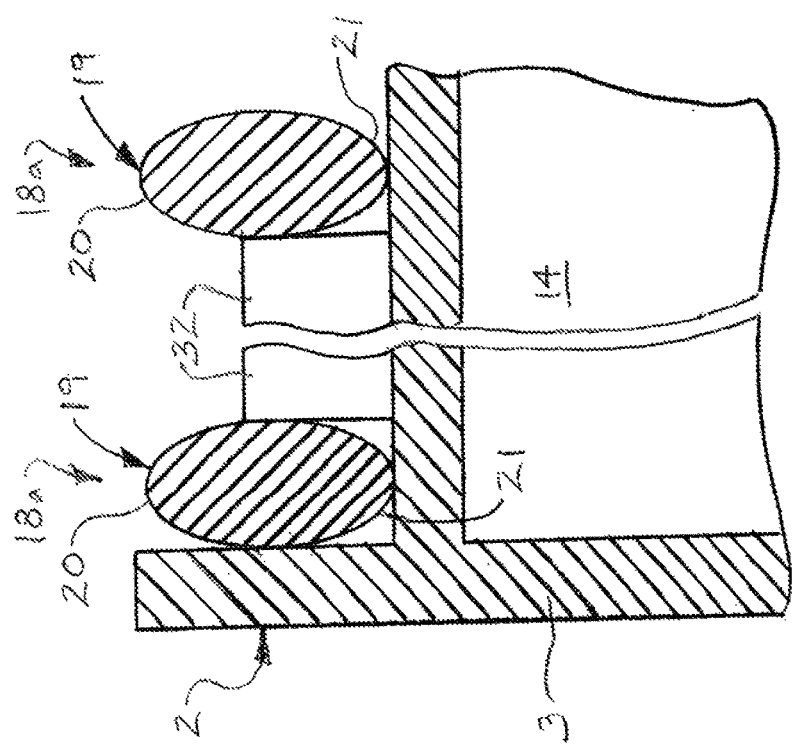
FIG. 12C is a cross-sectional view of the circumferential damper members and the longitudinal member of the damper assembly illustrated in FIG. 12A, with the longitudinal damper member and the circumferential damper members deformed into the deformation spaces in the deformed, force-transmitting configuration of the damper assembly.
Figure 12B:
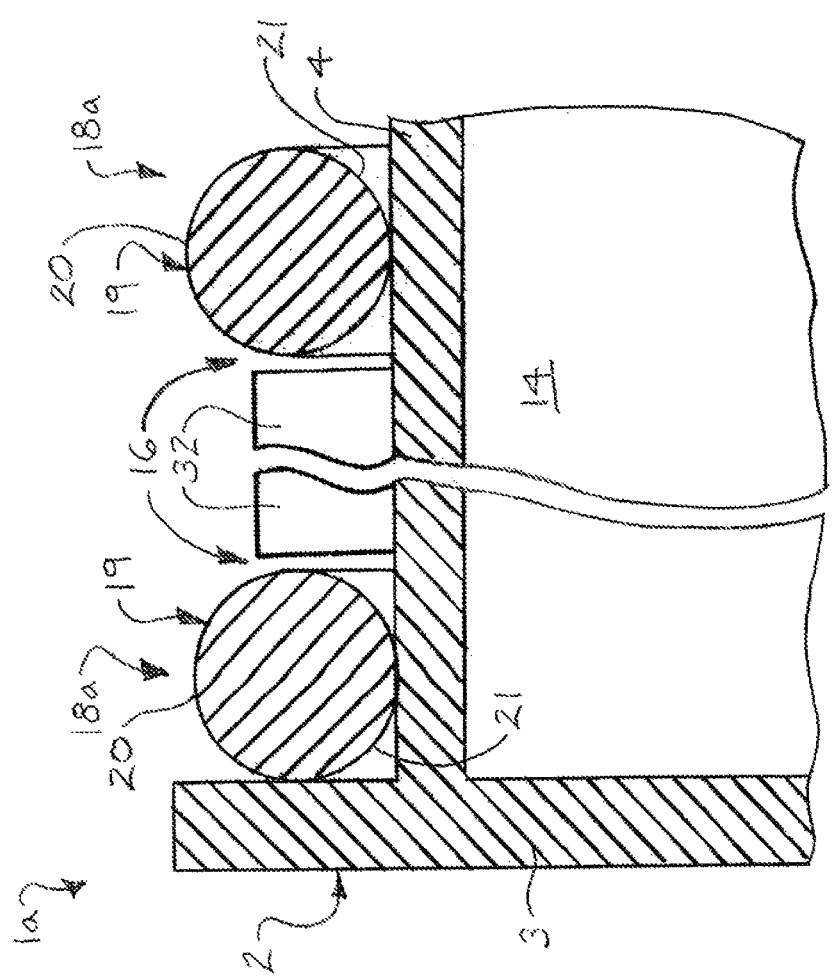
FIG. 12B is a cross-sectional view, taken along section lines 12B-12B in FIG. 12A, of a pair of circumferential damper members and a longitudinal damper member of the damper assembly, more particularly illustrating deformation spaces between the longitudinal damper member and the respective circumferential damper members in the relaxed configuration of the damper assembly.

As illustrated in FIGS. 12A-12C, in some embodiments of the damper assembly 1a, at least one elongated, rod-shaped, longitudinal damper member 32 may extend in parallel relationship with respect to the longitudinal axis of the adaptor shaft 4 of the drive adaptor 2 in combination with at least one circumferential damper member 18a which extends continuously around the adaptor shaft 4. In some embodiments, multiple longitudinal damper members 32 may extend between a pair of the circumferential damper members 18a at the adaptor base 3 and the cap plate 8, respectively, of the drive adaptor 2, as illustrated. A transfer lug space 34 may be formed by and between adjacent longitudinal damper members 32 in alignment or registration with each corresponding external transfer lug notch 29 in each circumferential damper member 18a. The at least one longitudinal damper member 32 may include at least one incompressible shear member and/or at least one elastomeric or compressible compression member. Incompressible or substantially incompressible materials which are suitable for each incompressible shear member may include but are not limited to plastic, metal, wood, composite material or any combination thereof. Elastomeric or compressible materials which are suitable for each compressible compression member may include but are not limited to rubber, plastic and/or composite material, for example and without limitation. In some embodiments, the length of the shear members and compression members may be chosen such that the shear members and compression members are compressed between the circumferential damper member or members 18a or between the adaptor base 3 and a circumferential damper member 18a or between a circumferential damper member 18a and the cap plate 8 of the drive adaptor 2. As illustrated in FIGS. 12B and 12C, at least one deformation space 16 may be defined by and between the longitudinal damper members 32 and each corresponding circumferential damper member 18a.

Application of the damper assembly 1a may be as was heretofore described with respect to the damper assembly 1 in FIG. 10A. In installation of the damper assembly 1a in the propeller 40, each propeller torque transfer lug 49 on the propeller hub drive sleeve 48 of the propeller hub 42 may insert into each corresponding transfer lug space 34 as well as each corresponding aligned or registering transfer lug notch 29 in each circumferential damper member 18a. Accordingly, both the circumferential damper members 18a and the longitudinal damper members 32 may collectively transmit torsion from the adaptor lugs 9 to the propeller torque transfer lugs 49 to rotate the propeller 40. The circumferential damper members 18a and the longitudinal damper members 32 of the damper assembly 1a may together provide a selected torsional and longitudinal resistance between the propeller drive shaft 45 and the propeller hub 42 while imparting a selected resilience and progressive deformation and shear capability between those components to prevent or minimize damage to the propeller drive system during power surges and loads and in the event that one of the propeller blades 41 of the rotating propeller 40 inadvertently strikes a submerged object (not illustrated). The number, material composition and thickness of the circumferential damper members 18*a* and the longitudinal damper members 32 may be selected and combined to achieve the desired torsional and longitudinal resistance between the propeller drive shaft 45 and the propeller 40.

As illustrated in FIGS. 12B and 12C, during gear changing or propeller striking events, the circumferential damper members 18*a* and/or the longitudinal damper members 32 may compress into the deformation spaces 16 therebetween, thereby enhancing the shock-absorbing and impact-sound absorbing capacity of the damper assembly 1 between the drive adaptor 2 and the marine propeller 40.

Figures 13A, 13B, 13C:
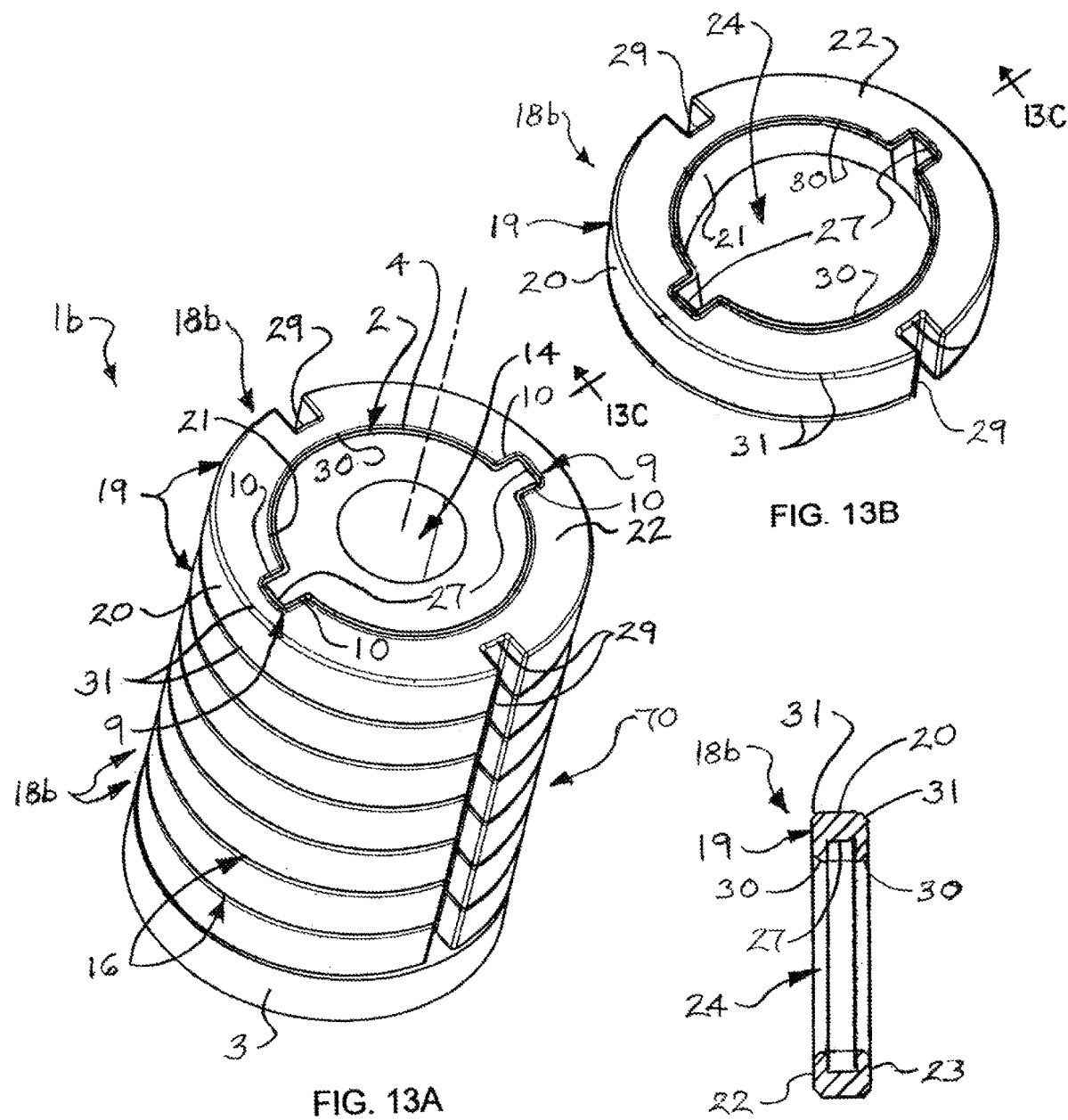
FIG. 13A is a perspective view of another alternative illustrative embodiment of the damper assemblies with multiple cylinder-shaped circumferential damper members deployed in adjacent relationship to each other on the adaptor shaft of the drive adaptor and deformation spaces between the circumferential damper members.
FIG. 13B is a perspective view of a typical cylinder-shaped circumferential damper member, removed from the adaptor shaft of the drive adaptor.
FIG. 13C is a cross-sectional view, taken along section lines 13C-13C in FIG. 13B, of the cylinder-shaped circumferential damper member.

Referring next to FIGS. 13A-16C of the drawings, the circumferential damper members (indicated by reference numerals 18*b*-18*d* in FIGS. 13A, 14A and 15A, respectively) may have various cross-sectional shapes to impart different torsional and longitudinal resistance characteristics to the respective damper assemblies 1*b*-1*d*. For example and without limitation, as illustrated in FIGS. 13A-13C, in some alternative illustrative embodiments of the damper assemblies, generally indicated by reference numeral 1*b* in FIG. 13A, the circumferential damper member body 19 of each circumferential damper member 18*b* may have a cylindrical shape with a pair of spaced-apart, annular, parallel inner damper edges 30 and a pair of spaced-apart, annular, parallel outer damper edges 31. Accordingly, the inner damper surface 21 may extend between the inner damper edges 30 and the outer damper surface 20 may extend between the outer damper edges 31. Each of the fore damper surface 22 and the aft damper surface 23 may extend between each corresponding inner damper edge 30 and outer damper edge 31. In some embodiments, each inner damper edge 30 and/or each outer damper edge 31 may be truncated, as illustrated. In other embodiments, each inner damper edge 30 and/or each outer damper edge 31 may be sharp or non-truncated.

Figure 13E:
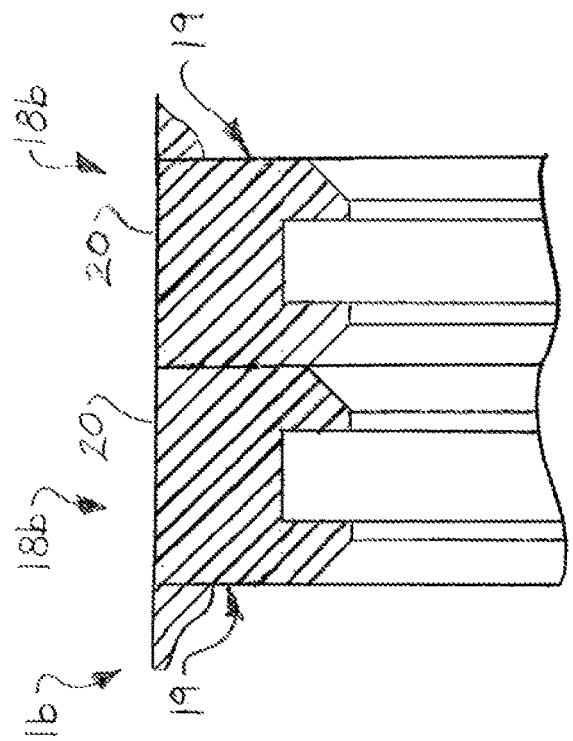
FIG. 13E is a cross-sectional view of the circumferential damper members of the damper assembly illustrated in FIG. 13A, with the circumferential damper members deformed into the deformation space in the deformed, force-transmitting configuration of the damper assembly.
Figure 13D:
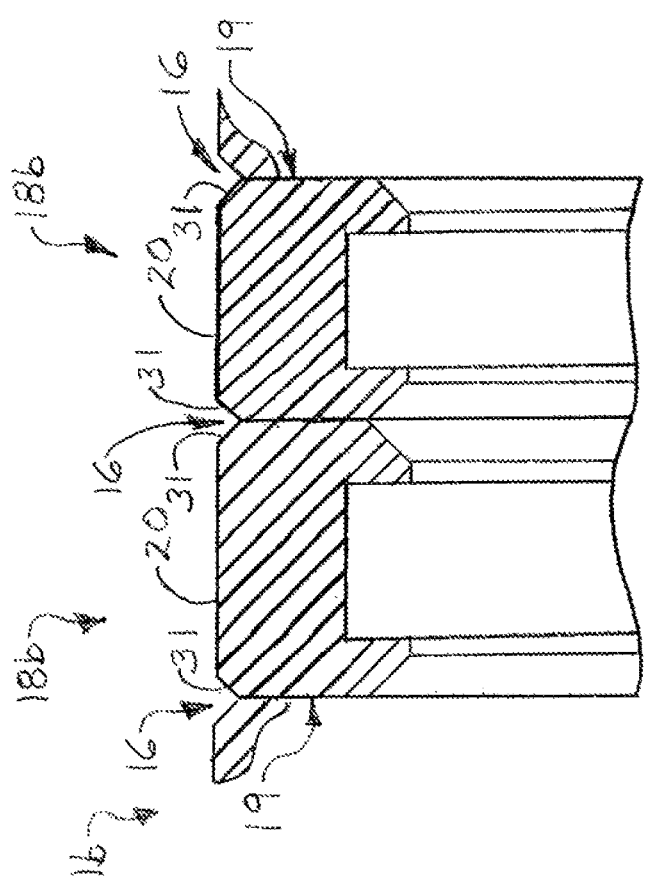
FIG. 13D is a cross-sectional view of a pair of adjacent circumferential damper members of the damper assembly illustrated in FIG. 13A, more particularly illustrating a deformation space between the adjacent circumferential damper members in the relaxed configuration of the damper assembly.

Application of the damper assembly 1*b* may be as was heretofore described with respect to application of the damper assembly 1 in FIG. 10A. As illustrated in FIGS. 13A and 131), in the assembled damper assembly 1*b*, at least one deformation space 16 may be formed by and between each pair of adjacent circumferential damper members 18*b*. Each deformation space 16 may extend into a continuous and uninterrupted circumferential or other shaped course between the adjacent circumferential damper members 18*b*. Accordingly, in the relaxed configuration of the damper assembly 1*b*, as illustrated in FIG. 13D, each deformation space 16 may have a maximal cross-sectional width or volume between the adjacent circumferential damper members 18*b*. In the deformed, force-transmitting configuration of the damper assembly 1*b*, in which the drive adaptor 2 applies a rotational force to the marine propeller 40 through the damper assembly 1, as illustrated in FIG. 13E, the circumferential damper members 18*b* may extend into the deformation space 16 as the deformation space 16 accommodates the compressed circumferential damper members 18*b*. Accordingly, the deformation-absorbing capacity of the deformation spaces 16 in the damper assembly 1*b* may enhance the shock-absorbing and impact-sound absorbing capacity of the damper assembly 1*b* between the drive adaptor 2 and the marine propeller 40 during gear changing or propeller striking events.

As illustrated in FIGS. 14A-14C, in another alternative illustrative embodiment of the damper assemblies 1*c*, the circumferential damper member body 19 of each circumferential damper member 18*c* may have a polygonal cross-section. Accordingly, in some embodiments, each circumferential damper member 18*c* may have an octagonal cross-section, as illustrated, with an outer truncated edge 36 which extends between the outer damper surface 20 and the fore damper surface 22 and between the outer damper surface 20 and the aft damper surface 23. An inner truncated edge 37 may in like manner extend between the inner damper surface 21 and the fore damper surface 22 and between the inner damper surface 21 and the aft damper surface 23.

Application of the damper assembly 1*c* may be as was heretofore described with respect to application of the damper assembly 1 in FIG. 10A. As illustrated in FIGS. 14D and 14E, in the assembled damper assembly 1*c*, at least one deformation space 16 may be formed by and between each pair of adjacent circumferential damper members 18*c*. Each deformation space 16 may extend in a continuous and uninterrupted circumferential or other shaped course between the adjacent circumferential damper members 18*c*. Accordingly, in the relaxed configuration of the damper assembly 1*c*, as illustrated in FIG. 141), each deformation space 16 may have a maximal cross-sectional width or volume between the adjacent circumferential damper members 18*c*. In the deformed, force-transmitting configuration of the damper assembly 1*c*, in which the drive adaptor 2 applies a rotational force to the marine propeller 40 through the damper assembly 1, as illustrated in FIG. 14E, the circumferential damper members 18*c* may extend into the deformation space 16 as the deformation space 16 accommodates the compressed circumferential damper members 18*c*. Accordingly, the deformation-absorbing capacity of the deformation spaces 16 in the damper assembly 1*c* may enhance the shock-absorbing and impact-sound absorbing capacity of the damper assembly 1*c* between the drive adaptor 2 and the marine propeller 40 during gear changing or propeller striking events.

As illustrated in FIGS. 15A-15C, in still another alternative illustrative embodiment of the damper assemblies 1*d*, the circumferential damper member body 19 of each circumferential damper member 18*d* may include at least one flat external surface 38 in the convex outer damper surface 20. In some embodiments, each circumferential damper member 18*d* may include at least one flat external surface 38 in each portion of the convex outer damper surface 20 which extends between each external transfer lug notch 29 and the corresponding adjacent internal adaptor lug notch 27 that is disposed in 90-degree relationship to the transfer lug notch 29, as illustrated. Each flat external surface 38 may have an elongated, oval shape, as illustrated, or may alternatively be rectangular or have an octagonal or other polygonal shape.

Application of the damper assembly 1*d* may be as was heretofore described with respect to application of the damper assembly 1 in FIG. 10A. As illustrated in FIGS. 15D and 15E, in the assembled damper assembly 1*d*, at least one deformation space 16 may be formed by and between each pair of adjacent circumferential damper members 18*d*. Each deformation space 16 may extend in a continuous and uninterrupted circumferential or other shaped course between the adjacent circumferential damper members 18*d*. Accordingly, in the relaxed configuration of the damper assembly 1*d*, as illustrated in FIG. 15D, each deformation space 16 may have a maximal cross-sectional width or volume between the adjacent circumferential damper members 18*d*. In the deformed, force-transmitting configuration of the damper assembly 1*d*, in which the drive adaptor 2 applies a rotational force to the marine propeller 40 through the damper assembly 1*d*, as illustrated in FIG. 15E, the circumferential damper members 18*d* may extend into the deformation space 16 as the deformation space 16 accommodates the compressed circumferential damper members 18*d*. Accordingly, the deformation-absorbing capacity of the deformation spaces 16 in the damper assembly 1*d* may enhance the shock-absorbing and impact-sound absorbing capacity of the damper assembly 1*d* between the drive adaptor 2 and the marine propeller 40 during gear changing or propeller striking events.

Referring next to FIGS. 16A-16C of the drawings, another alternative circumferential damper member 18*e* which is suitable for some embodiments of the damper assemblies is illustrated. Each circumferential damper member 18*e* of the damper assembly may include at least one, and typically, a pair of arcuate flat fore damper surfaces 22*b* (and a pair of arcuate flat aft damper surfaces, not illustrated) which alternate with at least one, and typically, a pair of arcuate convex fore damper surfaces 22*a* (and a pair of arcuate convex aft damper surfaces, not illustrated). At least one, and typically, a pair of arcuate flat outer damper surfaces 20*a* may alternate with at least one, and typically, a pair of arcuate convex outer damper surfaces 20*b*. Each flat outer damper surface 20*a* may correspond in position and length to each corresponding flat fore damper surface 22*b* and each corresponding flat aft damper surface (not illustrated). Likewise, each convex outer damper surface 20*b* may correspond in position and length to each corresponding convex fore damper surface 22*a* and each corresponding convex aft damper surface (not illustrated). An arcuate convex inner damper surface 21*a* may correspond in position and length to each corresponding flat fore damper surface 22*b*. Likewise, an arcuate flat inner damper surface 21*b* may correspond in position and length to each corresponding convex outer damper surface 20*b*. Each internal adaptor lug notch 27 may extend into each corresponding convex inner damper surface 21*a*. Each external transfer lug notch 29 may extend into each corresponding convex outer damper surface 20*b*.

Application of the damper assembly having the circumferential damper members 18*e* may be as was heretofore described with respect to application of the damper assembly 1 in FIG. 10A. As illustrated in FIGS. 16B and 16C, in the assembled damper assembly (not illustrated), at least one deformation space 16 (FIG. 10A) may be formed by and between each pair of adjacent circumferential damper members 18*e*. Each deformation space 16 may extend in a continuous and uninterrupted circumferential or other shaped course between the adjacent circumferential damper members 18*e*. Accordingly, in the relaxed configuration of the damper assembly (not illustrated), as illustrated in FIG. 1613, each deformation space 16 may have a maximal cross-sectional width or volume between the adjacent circumferential damper members 18*e*. In the deformed, force-transmitting configuration of the damper assembly, in which the drive adaptor 2 applies a rotational force to the marine propeller 40 through the damper assembly 1, as illustrated in FIG. 16C, the circumferential damper members 1*e* may extend into the deformation space 16 as the deformation space 16 accommodates the compressed circumferential damper members 18*e*. Accordingly, the deformation-absorbing capacity of the deformation spaces 16 in the damper assembly may enhance the shock-absorbing and impact-sound absorbing capacity of the damper assembly between the drive adaptor 2 and the marine propeller 40 during gear changing or propeller striking events.

It will be appreciated by those skilled in the art that the damper assemblies provide a high degree of customization in selecting the desired torsional and longitudinal resistance between the propeller drive shaft 45 and the marine propeller 40. The circumferential damper members 18 and the longitudinal damper members 32 which are selected for inclusion in the damper assembly 1 can be selected based on the compressible or incompressible material of each. Moreover, the circumferential damper members 18, with or without the longitudinal damper members 32, can be mixed and matched to achieve the desired characteristics of the assembled damper assembly 1. For example and without limitation, in some embodiments, one or more of the typically toroidal circumferential damper members 18*a* (FIGS. 11A-12A) can be combined with one or more of the cylindrical circumferential damper members 18*b* (FIGS. 13A-13C) in the damper assembly. In other embodiments, one or more of the truncated circumferential damper members 18*c* (FIGS. 14A-14C) can be combined with one or more of the external flat surfaces 38 (FIGS. 15A-15C).

Figure 17A:
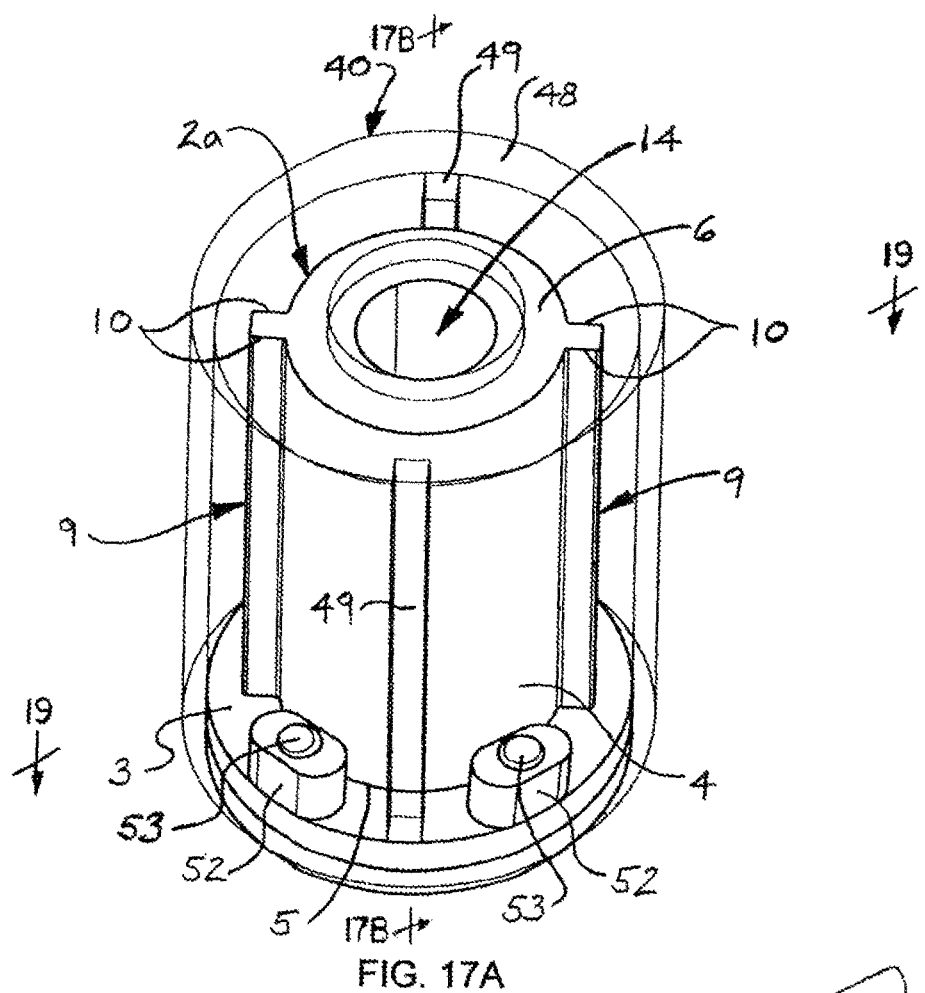
FIG. 17A is a front perspective view of an alternative drive adaptor deployed in place in the propeller hub drive sleeve of the marine propeller according to some embodiments of the damper assemblies, with multiple adjustable drive stop lugs on the adaptor base of the drive adaptor and the circumferential damper members omitted for clarity.
Figure 17B:
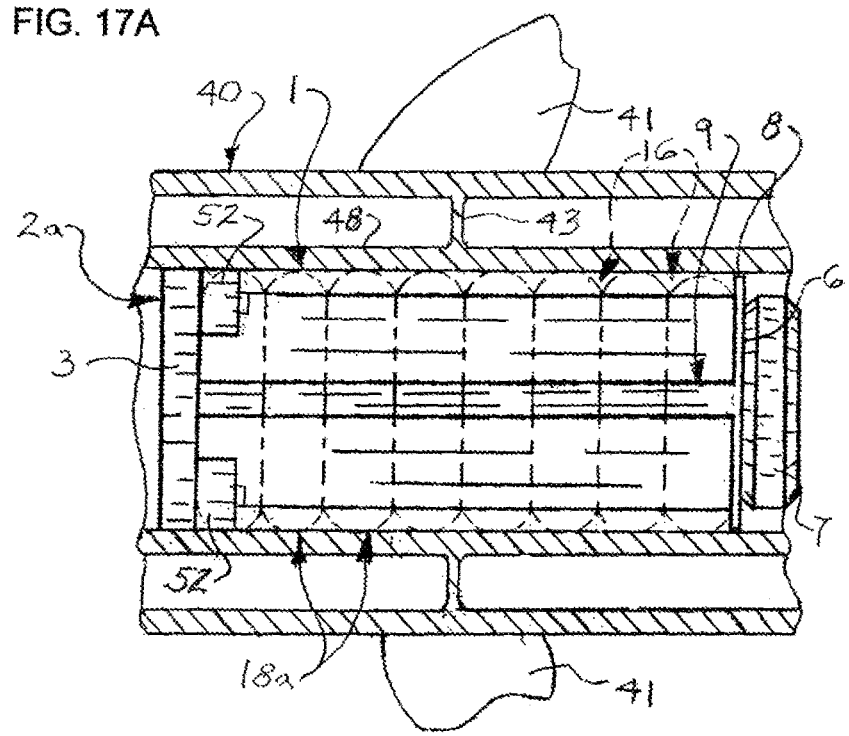
FIG. 17B is a longitudinal sectional view, taken along section lines 17B-17B in FIG. 17A, of the marine propeller, drive adaptor and damper assembly, with the circumferential damper members of the damper assembly shown in phantom.
Figure 18:
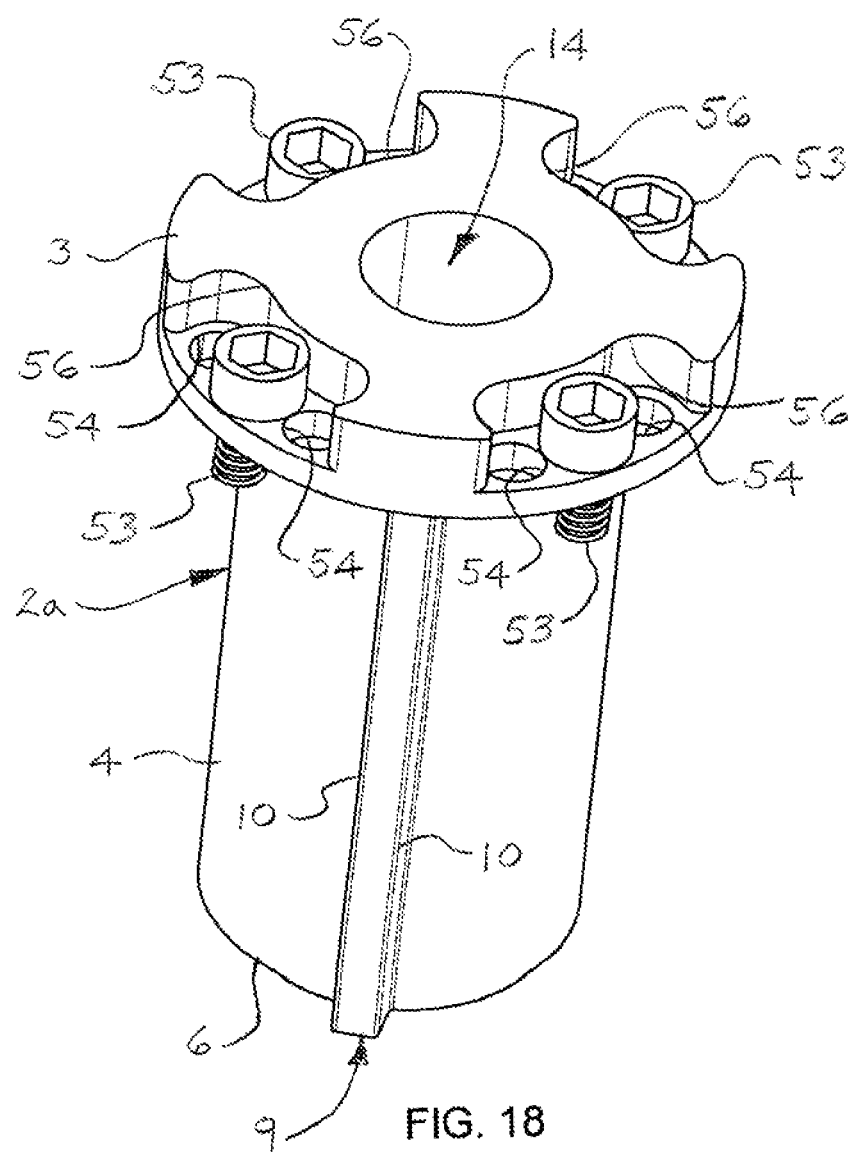
FIG. 18 is a rear perspective view of the drive adaptor with adjustable drive stop lugs illustrated in FIG. 17.
Figure 20:
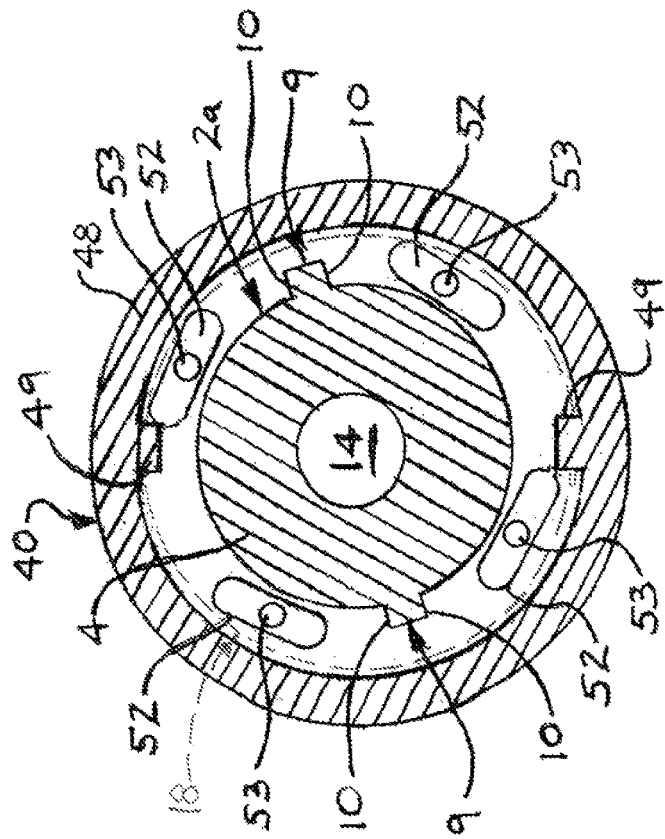
FIG. 20 is a cross-sectional view, also taken along section lines 19-19 in FIG. 17A, with the adjustable drive stop lugs on the drive adaptor engaging the respective propeller torque transfer lugs on the propeller hub drive sleeve.
Figure 19:
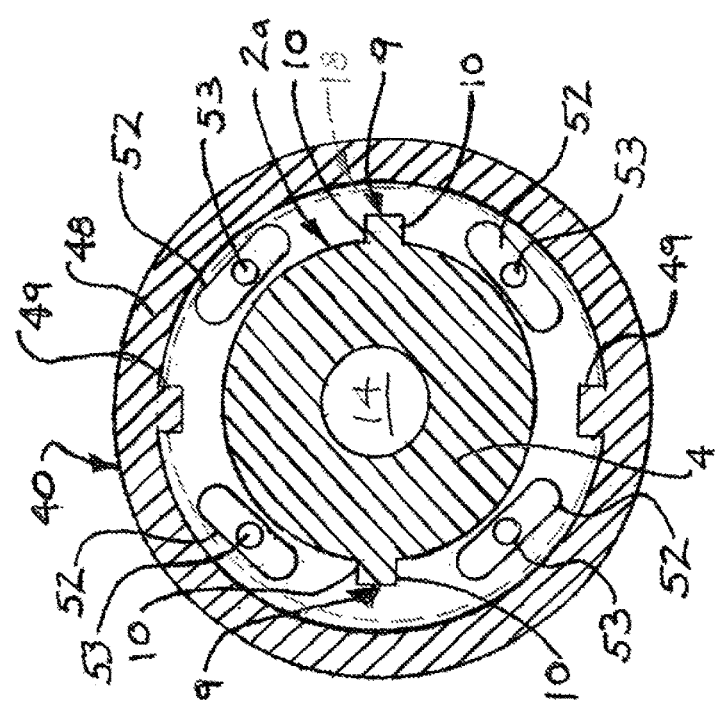
FIG. 19 is a cross-sectional view, taken along section lines 19-19 in FIG. 17A, of the propeller hub drive sleeve and drive adaptor, with the adjustable drive stop lugs on the drive adaptor disengaged from the respective propeller torque transfer lugs on the propeller hub drive sleeve.

Referring next to FIGS. 17A-20 of the drawings, an alternative drive adaptor 2*a* according to some embodiments of the of the damper assembly 1 is shown deployed in place in the propeller hub drive sleeve 48 of the marine propeller 40. In FIG. 17A, the circumferential damper members 18*a* (shown in phantom in FIG. 17B) of the damper assembly 1 are omitted for clarity. At least one, and typically, multiple adjustable drive stop lugs 52 may be provided on the adaptor base 3 of the drive adaptor 2*a*. The position of each adjustable drive stop lug 52 between each adaptor lug 9 on the drive adaptor 2*a* and each corresponding consequent propeller torque transfer lug 49 on the propeller hub drive sleeve 48 may be selectively adjustable according to the knowledge of those skilled in the art. Accordingly, as illustrated in FIG. 18, in some embodiments, at least one, and typically, multiple stop lug fastener cavities 56 may be provided in the adaptor base 3. A set of multiple stop lug fastener openings 54 may extend through the adaptor base 3 at each stop lug fastener cavity 56. A stop lug fastener 53 may extend through a selected one of the stop lug fastener openings 54 in each set of stop lug fastener openings 54 and threaded through a registering fastener opening (not illustrated) in each adjustable drive stop lug 52. Depending on which stop lug fastener opening 54 is selected for attachment of the adjustable drive stop lug 52, each adjustable drive stop lug 52 can be positioned equidistant between each adaptor lug 9 and each corresponding consequent propeller torque transfer lug 49 or closer to one or the other of the adaptor lug 9 and the propeller torque transfer lug 49. In this manner, in the event that the circumferential damper members 18*a* (FIG. 10A) shear or deform beyond their structural integrity and functional capacity to continue to transmit the torsional force from the propeller drive shaft 45 to the marine propeller 40, the length of the arc through which the drive adaptor 2*a* must rotate until the adjustable drive stop lugs 52 engage the respective propeller torque transfer lugs 49, as illustrated in FIGS. 19 and 20, can be selected or adjusted. Alternative techniques known by those skilled in the art may be used to adjustably mount each adjustable drive stop lug 52 on the adaptor base 3.

Referring next to FIGS. 22-32 of the drawings, another illustrative embodiment of the damper assemblies is generally indicated by reference numeral 101. Unless otherwise noted, in the damper assembly 101, elements which are analogous to the respective elements of the damper assembly 1 that was heretofore described with respect to FIGS. 1-10C are designated by the same respective numerals in the 101-199 series in FIGS. 22-32. As particularly illustrated in FIG. 24, the damper assembly 101 may include a damper sleeve 174. The damper sleeve 174 may have a damper sleeve wall 175 which may be elongated and has a fore sleeve end 178 and an aft sleeve end 179. In the assembled damper assembly 101, the fore sleeve end 178 may correspond in position to the fore shaft end 106 whereas the aft sleeve end 179 may correspond in position to the aft shaft end 105 of the adaptor shaft 104. A sleeve bore 181 (FIG. 25) may traverse the damper sleeve wall 175 from the fore sleeve end 178 to the aft sleeve end 179. An inner wall surface 176 of the damper sleeve wall 175 may face the sleeve bore 181. At least one longitudinal lug slot 182 may extend into the inner wall surface 176 from the fore sleeve end 178 to the aft sleeve end 179. In some embodiments, four lug slots 182 may extend into the inner wall surface 176 in equally spaced-apart relationship to each other around the circumference of the damper sleeve wall 175, as illustrated. An equal number of the adaptor lugs 109 may extend from the adaptor shaft 104 of the drive adaptor 102. Accordingly, the sleeve bore 181 of the damper sleeve 174 may be suitably sized and configured to receive and accommodate the adaptor shaft 104 of the drive adaptor 102 as the adaptor lugs 109 on the adaptor shaft 104 insert into the respective companion lug slots 182 in the inner wall surface 176.

Figure 22:
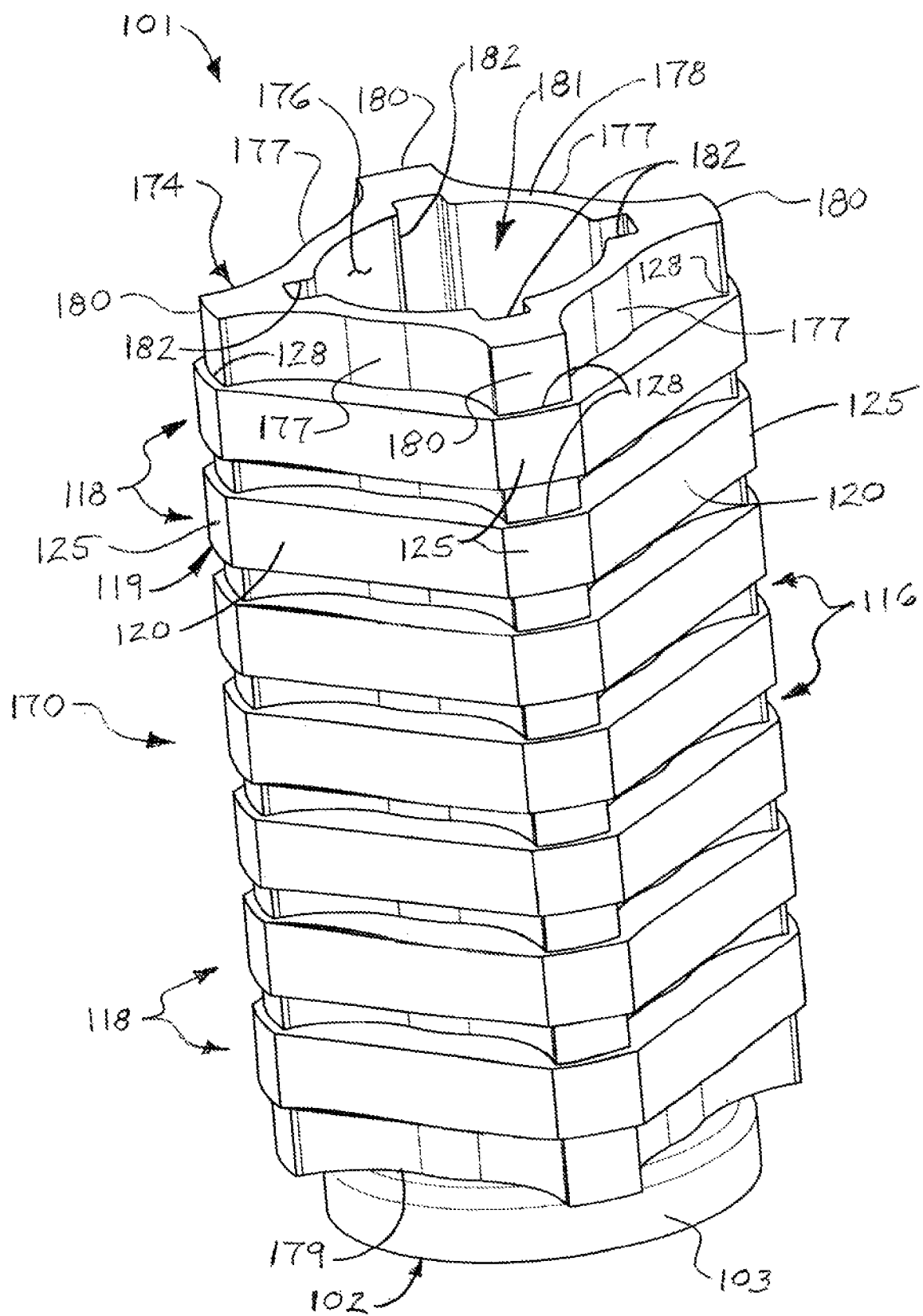
FIG. 22 is a perspective view of another alternative illustrative embodiment of the damper assemblies, with a damper sleeve drivingly engaged by the drive adaptor and multiple circumferential damper members drivingly engaged by the damper sleeve.
Figure 23:
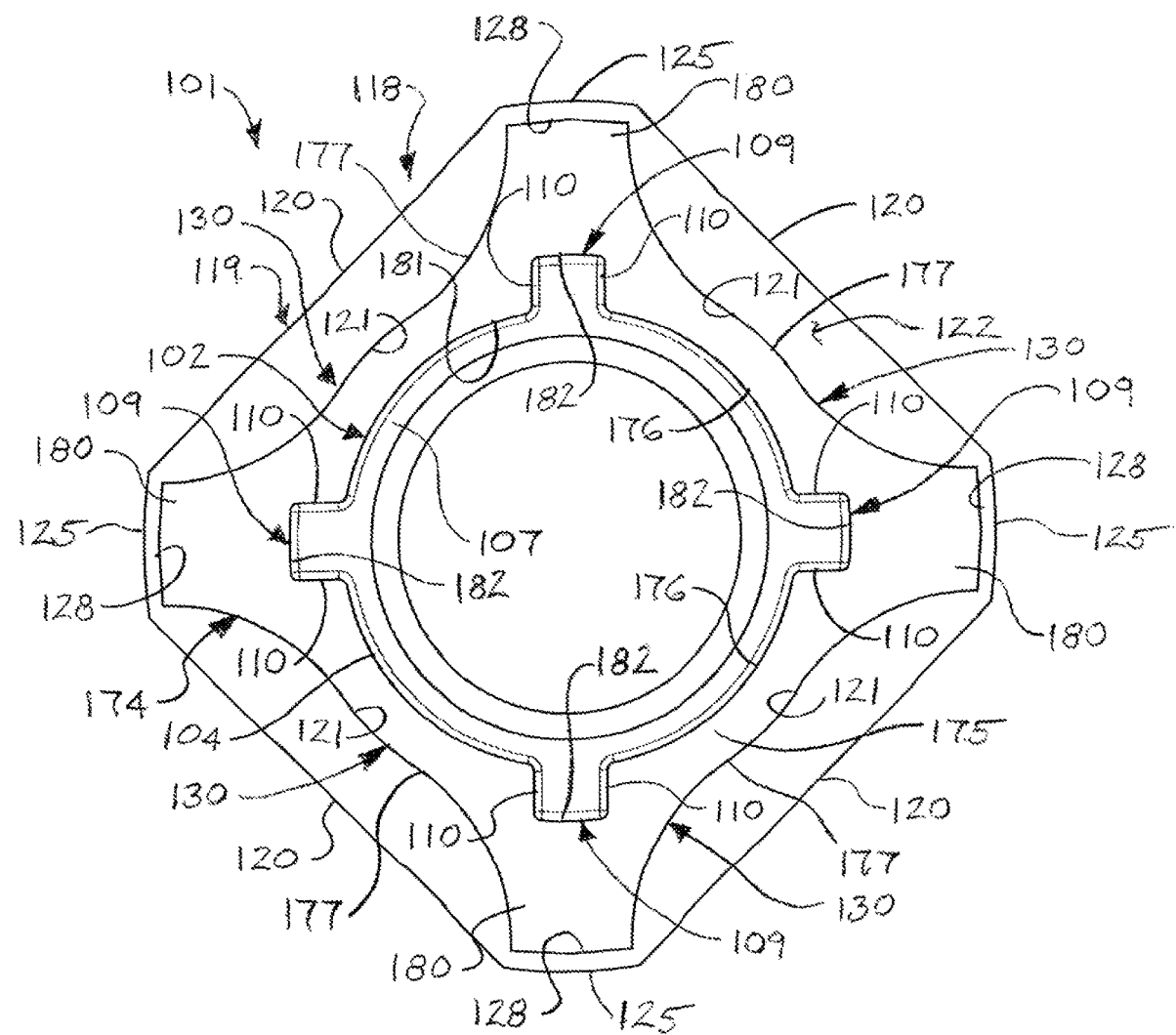
FIG. 23 is a fore end view of the damper assembly illustrated in FIG. 22.
Figure 25:
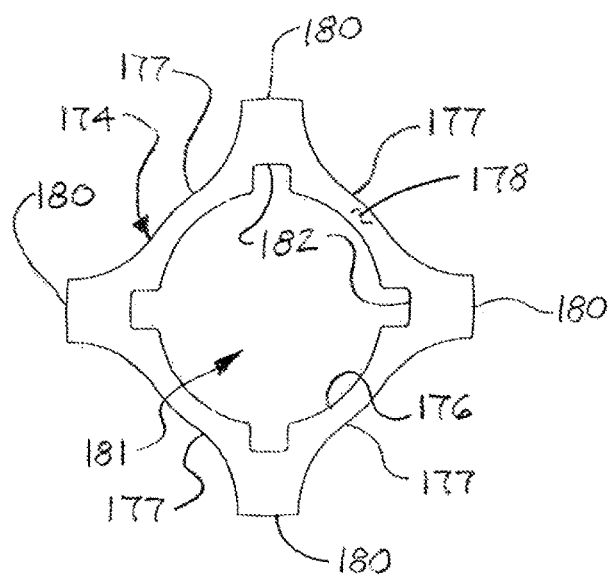
FIG. 25 is a fore end view of the typical damper sleeve of the damper assembly.
Figure 26:
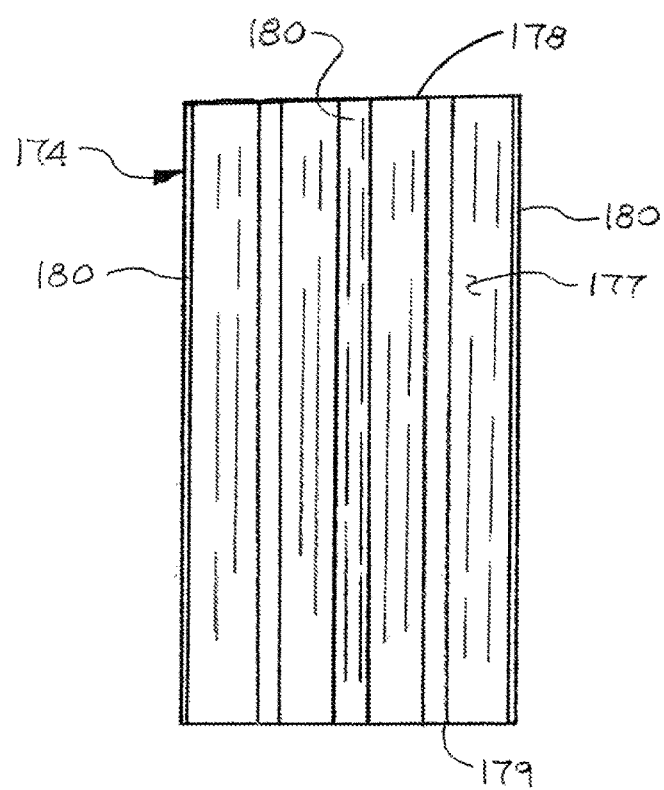
FIG. 26 is a side view of the damper sleeve.

At least one elongated sleeve lug 180 may extend from the outer wall surface 177 of the damper sleeve wall 175 and traverse the length of the damper sleeve 174 from the fore sleeve end 178 to the aft sleeve end 179 for purposes which will be hereinafter described. In some embodiments, four sleeve lugs 180 may extend from the outer wall surface 177 in equally spaced-apart relationship to each other, as illustrated in FIGS. 22, 23 and 25. An outer sleeve surface 177 of the damper sleeve wall 175 may extend between the sleeve lugs 180. The outer sleeve surface 177 may have a substantially concave shape as it extends between each adjacent pair of the sleeve lugs 180.

The damper sleeve 174 may include a substantially non-elastomeric and incompressible material or an elastomeric or compressible material. Non-elastomeric and incompressible materials which are suitable for the purpose may include but are not limited to such materials as plastic, metal, wood, composite material or any combination thereof. Elastomeric or compressible materials which are suitable for the purpose may include but are not limited to rubber, plastic and/or composite material, for example and without limitation.

In the assembled damper assembly 101, at least one circumferential damper member 118 may be disposed on the adaptor shaft 104 between the adaptor base 103 and the cap plate 108 of the drive adaptor 102 in adjacent relationship to each other. Each circumferential damper member 118 may encircle the adaptor shaft 104 and may include a substantially non-elastomeric and incompressible material or an elastomeric or compressible material. Non-elastomeric and incompressible materials which are suitable for the purpose may include but are not limited to such materials as plastic, metal, wood, composite material or any combination thereof. Elastomeric or compressible materials which are suitable for the purpose may include but are not limited to rubber, plastic and/or composite material, for example and without limitation. The circumferential damper members 118 may form a rotational stop between the damper sleeve 174 and the propeller hub drive sleeve 148 (FIG. 29) of the marine propeller 140 as the damper assembly 101 transmits rotation from the drive adaptor 102 to the marine propeller 140.

Figure 27:
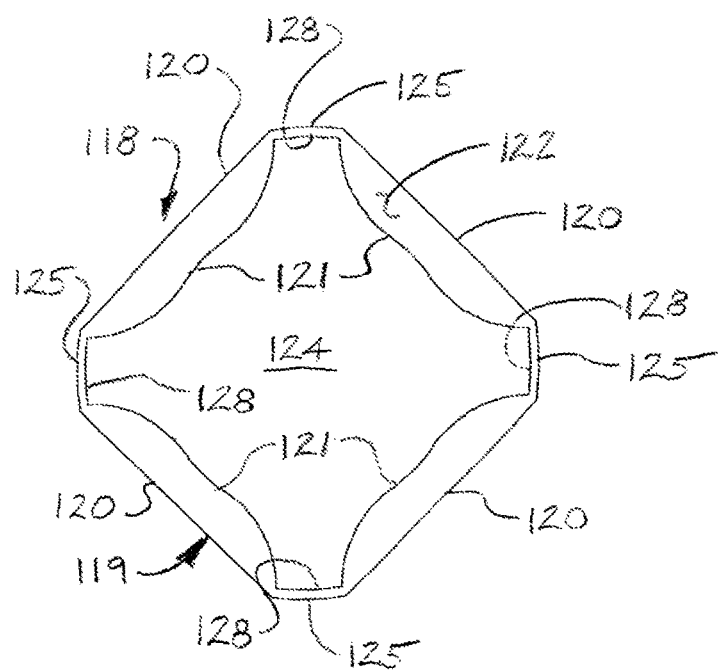
FIG. 27 is a fore end view of a typical circumferential damper member of the damper assembly illustrated in FIG. 22.
Figure 28:
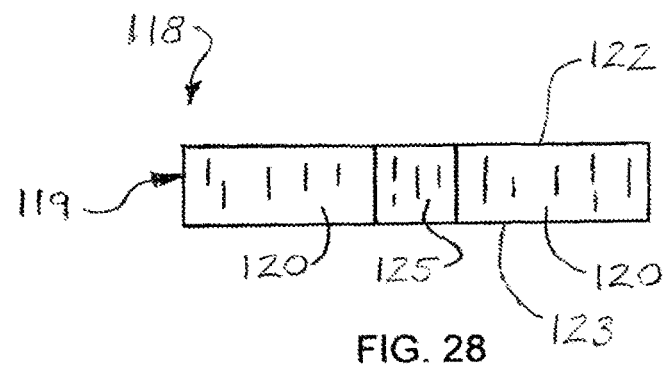
FIG. 28 is a side view of the circumferential damper member.

As illustrated in FIGS. 27 and 28, each circumferential damper member 118 may include a circumferential damper member body 119 having a fore damper surface 122, an alt damper surface 123 and a damper opening 124 extending from the fore damper surface 122 to the alt damper surface 123. The circumferential damper member body 119 may have multiple, flat outer damper surfaces 120 and convex inner damper surfaces 121 opposite the respective outer damper surfaces 120. The outer damper surfaces 120 may merge into rounded damper shoulders 125 which extend between the adjacent outer damper surfaces 120. Lug cavities 128 between the inner damper surfaces 121 may communicate with the damper opening 124 inside the respective damper shoulders 125.

In the assembled damper assembly 101, multiple circumferential damper members 118 may be placed on the damper sleeve 174 as the damper sleeve 174 is inserted through the damper opening 124 of each circumferential damper member 118. Accordingly, the exterior sleeve lugs 180 on the damper sleeve 174 may be inserted into the respective companion interior lug cavities 128 in each circumferential damper member 118 with the sleeve lugs 180 substantially aligning or registering with the respective damper shoulders 125 on each circumferential damper member 118. As illustrated in FIG. 22, a selected number of the circumferential damper members 118 may be placed typically in spaced-apart relationship to each other along the length of the damper sleeve 174. As illustrated in FIG. 23, interfaces 130 may be formed between the inner damper surfaces 121 of each circumferential damper member body 119 and the respective outer sleeve surfaces 177 of the damper sleeve 174. In some embodiments, each interface 130 may have a curved or irregular shape, as illustrated in FIG. 23. In other embodiments, each interface 130 may have a straight configuration (FIG. 31), a multi-faceted configuration (FIG. 32) and/or any other suitable shape or configuration.

Figure 24:
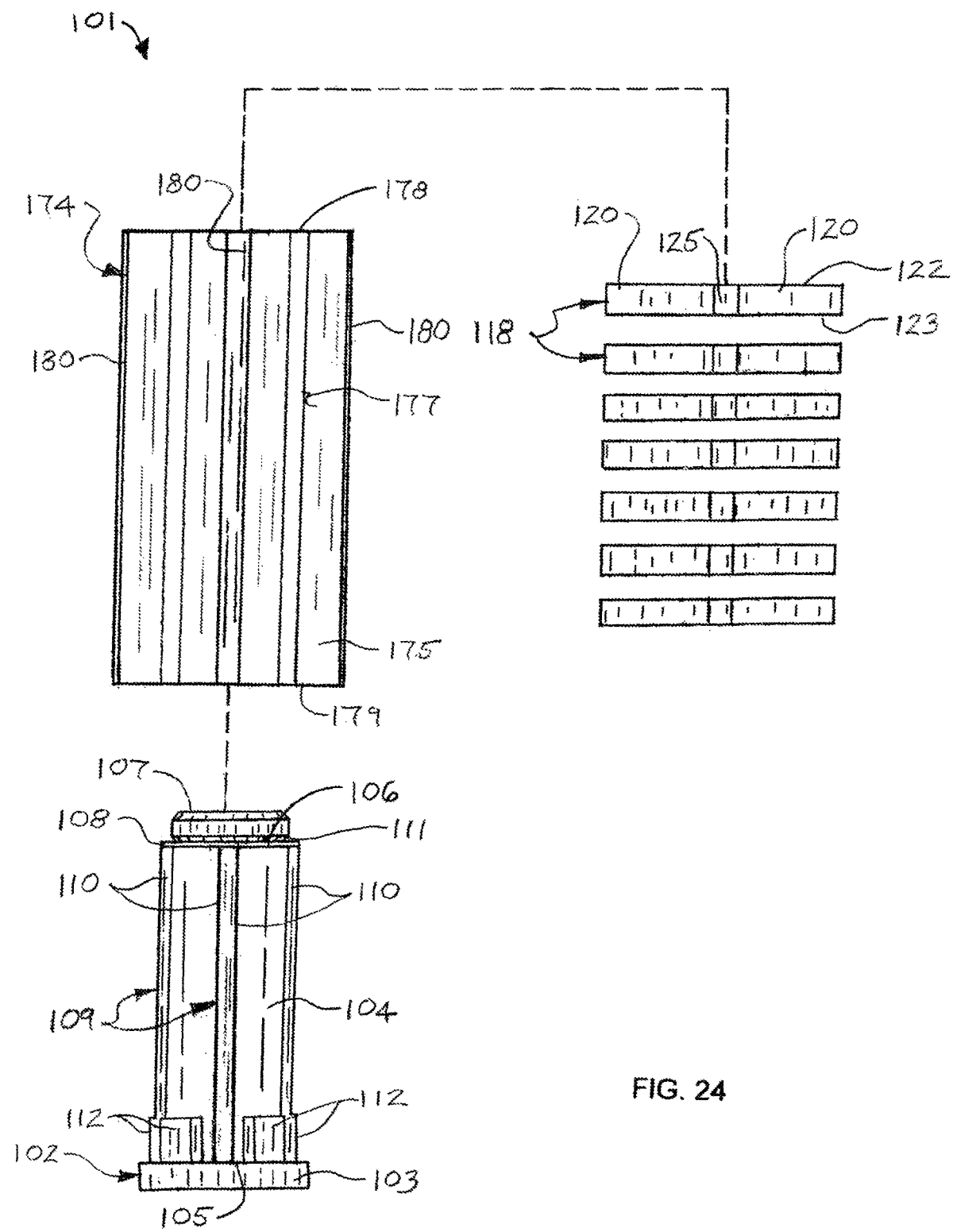
FIG. 24 is an exploded side view of the disassembled damper assembly illustrated in FIG. 22.

As illustrated in FIG. 24, in typical assembly of the damper assembly 101, at least one circumferential damper member 118 may be deployed in place on the damper sleeve 174 as the damper sleeve 174 is inserted through the damper opening 124 (FIG. 27) of each circumferential damper member 118 and the exterior sleeve lugs 180 on the damper sleeve 174 insert into the respective companion interior lug cavities 128 in the circumferential damper member body 119 of each circumferential damper member 118. As illustrated in FIG. 22, in some embodiments, a selected number of the circumferential damper members 118 may be placed on the damper sleeve 174 typically in spaced-apart relationship to each other between the fore sleeve end 178 and the aft sleeve end 179.

Figure 29:
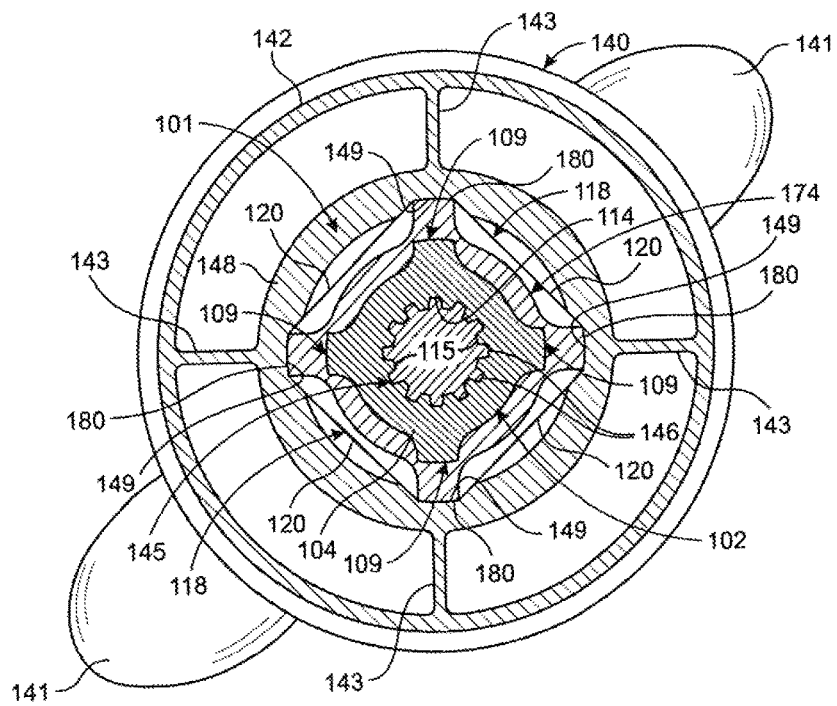
FIG. 29 is a cross-sectional view of the illustrative damper assembly of FIG. 22 in the assembled state and disposed inside the propeller drive hub sleeve of the marine propeller with the damper sleeve and the circumferential damper members of the damper assembly in a relaxed configuration.

As further illustrated in FIGS. 23 and 24, the adaptor shaft 104 of the drive adaptor 102 may be inserted into the sleeve bore 181 (FIG. 23) of the damper sleeve 174 as the exterior adaptor lugs 109 on the drive adaptor 102 insert into the respective companion interior lug slots 182 in the inner wall surface 176 of the damper sleeve wall 175. The damper sleeve 174 with the circumferential damper members 118 deployed thereon may be inserted in the propeller hub drive sleeve 148 of the marine propeller 140 as the exterior sleeve lugs 180 on the damper sleeve 174 and the exterior damper shoulders 125 on each circumferential damper member 118 insert into respective interior lug slots 149 (FIGS. 29 and 30) in the interior surface of the propeller hub drive sleeve 148. As illustrated in FIG. 29, the adaptor bore 114 of the drive adaptor 102 may receive the propeller drive shaft 145, with the drive shaft splines 146 thereof engaging the companion internal adaptor drive splines 115 of the drive adaptor 102.

As further illustrated in FIG. 29, in the assembled damper assembly 101, the damper sleeve 174 may be interposed between the adaptor shaft 104 of the drive adaptor 102 and the circumferential damper members 118, and the circumferential damper members 118 may be interposed between the damper sleeve 174 and the propeller hub drive sleeve wall 148 of the propeller hub 142, as well as between the adjacent sleeve lugs 180 of the damper sleeve 174. Thus, the damper assembly 101 may attenuate or dampen torsional forces transmitted from the propeller drive shaft 145 to the marine propeller 140 to reduce shock and impact sounds during gear changing or propeller striking events. Additionally, the damper sleeve 174 and the circumferential damper members 118 may form a tensile spring 170 (FIG. 22) which, upon termination of torque applied to the propeller drive shaft 145 and drive adaptor 102, may eliminate or reduce deadband or "play" between the propeller 140 and the propeller drive shaft 145.

As illustrated in FIG. 22, at least one deformation space 116 may be formed by and between each pair of adjacent circumferential damper members 118. Each deformation space 116 may extend in a continuous and uninterrupted circumferential or other shaped course between the adjacent circumferential damper members 118. Accordingly, in the relaxed configuration of the damper assembly 101, each deformation space 116 may have a maximal cross-sectional width or volume between the adjacent circumferential damper members 118. In the deformed, force-transmitting configuration of the damper assembly 101, in which the drive adaptor 102 (FIG. 29) applies a rotational force to the marine propeller 140 through the damper assembly 101, the circumferential damper members 118 may extend into the deformation space 116 as the deformation space 116 accommodates the compressed circumferential damper members 118. Accordingly, the deformation-absorbing capacity of the deformation spaces 116 in the damper assembly 101 may enhance the shock-absorbing and impact-sound absorbing capacity of the damper assembly 101 between the drive adaptor 102 and the marine propeller 140 during gear changing or propeller striking events.

Figure 30:
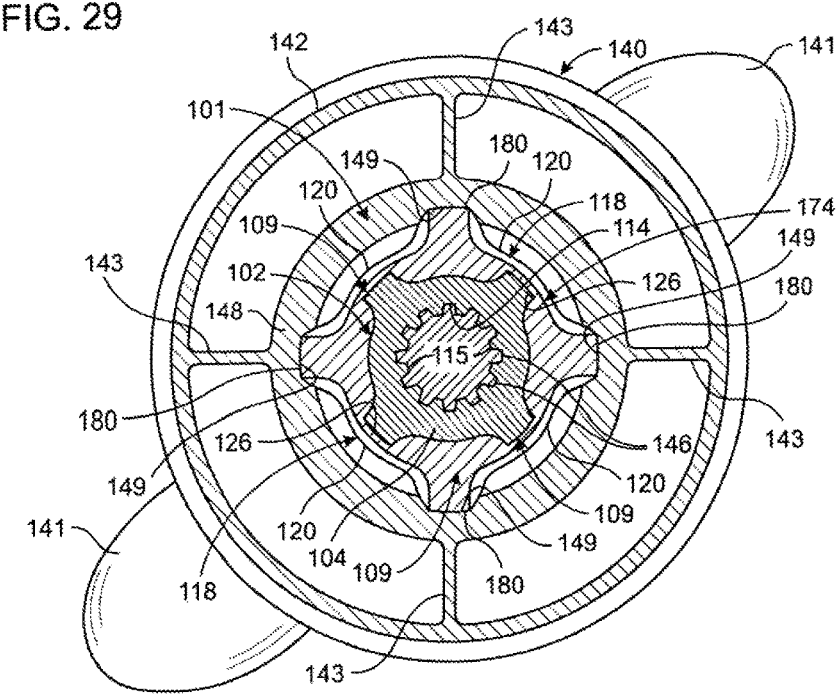
FIG. 30 is a cross-sectional view of the illustrative damper assembly of FIG. 29 in the propeller drive hub sleeve of the marine propeller, with the damper sleeve and the circumferential damper members of the damper assembly in a deformed, force-transmitting configuration.
Figure 31:
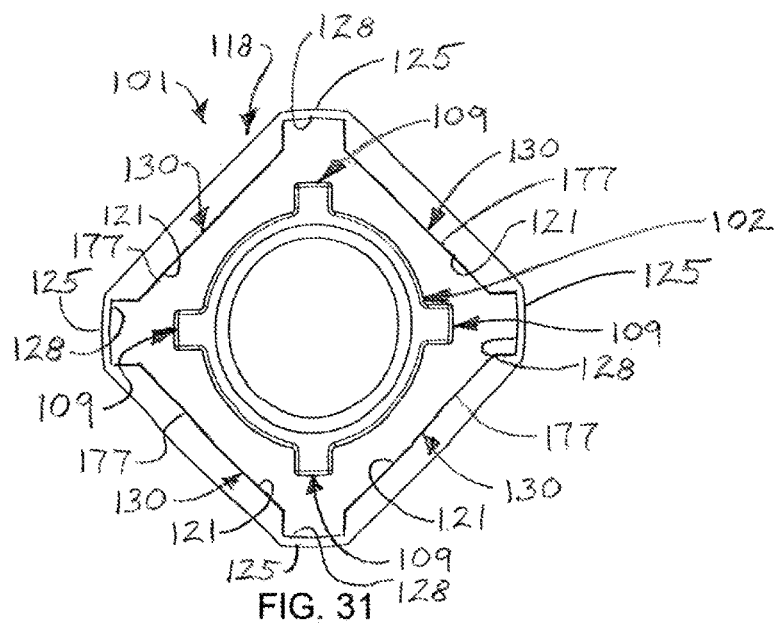
FIG. 31 is a fore end view of an alternative illustrative embodiment of the damper assembly illustrated in FIG. 22, more particularly illustrating a straight interface between the inner damper surface of each circumferential damper member and the outer sleeve surface of the damper sleeve.
Figure 32:
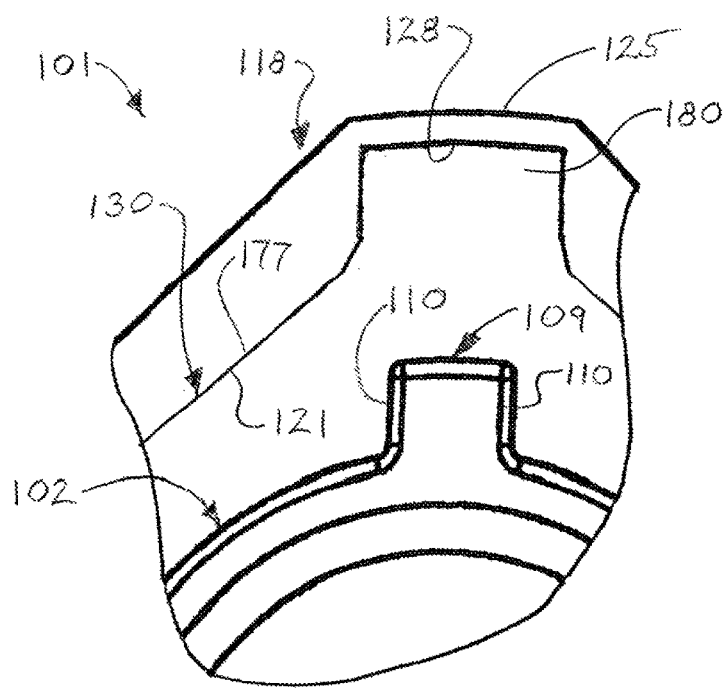
FIG. 32 is an enlarged sectional view of a portion of an alternative damper assembly to that illustrated in FIG. 22, more particularly illustrating a faceted interface between the inner damper surface of each circumferential damper member and the outer sleeve surface of the damper sleeve according to some embodiments of the damper assembly.

Referring again to FIGS. 29 and 30 of the drawings, in typical operation of the damper assembly 101, as the rotating propeller drive shall 145 applies a torque load to the drive adaptor 102, the adaptor shaft 104 of the drive adaptor 102 may rotate in the counterclockwise direction in FIG. 29. Accordingly, the adaptor lugs 109 of the drive adaptor 102 may initially apply torsion against the damper sleeve 174 typically via the respective interior lug slots 182 (FIG. 23) in the interior wall surface 176 of the damper sleeve wall 175 of the damper sleeve 174. The damper sleeve 174 may, in turn, apply torsion against the circumferential damper member body 119 of each circumferential damper member 118 typically via the sleeve lugs 180 at the respective interior lug cavities 128 of each circumferential damper member 118. The circumferential damper member body 119 of each circumferential damper member 118 may in turn apply torsion against the propeller hub drive sleeve 148 typically via the damper shoulders 125 at the respective lug slots 149. Consequently, the circumferential damper member body 119 of each circumferential damper member 118 may be compressed between each sleeve lug 180 of the damper sleeve 174 and the adjacent lug slot 149 in the propeller hub drive sleeve 148. As illustrated in FIG. 30, a deformation cavity 126 may form at the trailing portion of the damper sleeve wall 175 at the point where each adaptor lug 109 pushes against the leading portion of the damper sleeve wall 175. The damper sleeve 174 and the circumferential damper members 118 may thus collectively transmit torsion from the adaptor lugs 109 to the propeller hub drive sleeve 148 to rotate the propeller 140.

In the event of sudden gear changes or power surges at start-up, or if one or more of the propeller blades 41 (FIG. 1) strikes an underwater obstacle (not illustrated), rotation of the propeller hub 142 may suddenly slow or stop as the adaptor shaft 104 of the drive adaptor 102 continues to be rotated by the propeller drive shaft 144. The circumferential damper members 118 may compress into the deformation spaces 116 (FIG. 22) therebetween, thereby enhancing the shock-absorbing and impact-sound absorbing capacity of the damper assembly 101 between the drive adaptor 102 and the marine propeller 140 during gear changing or propeller striking events. Consequently, rotation of the propeller hub drive sleeve 148 may substantially slow down or stop as the adaptor lugs 109 on the adaptor shaft 104 continue counterclockwise rotation with the drive adaptor 102, and the damper sleeve 174 and/or the circumferential damper members 118 may be collectively sheared as the compressive torque load generated between the slow or stationary propeller hub drive sleeve 148 and the still rotating adaptor lugs 109 increases. Accordingly, the damper sleeve 174 and the circumferential damper members 118 may or may not shear, depending upon the magnitude of the torque load or shock between the drive adaptor 102 and the propeller drive shaft 145 and whether the propeller 40 (FIG. 1) disengages the submerged obstacle. Typically, the damper sleeve 174 and the circumferential damper members 118 may not be completely sheared to provide continued driving engagement of the propeller drive shaft 145 with the propeller 140 and facilitate sustained rotation and driving operation of the submerged propeller 140 in the water. The sheared or damaged damper sleeve 174 and/or circumferential damper members 118 can subsequently be easily replaced for continued operation of the marine propeller 40 typically by removing the adaptor shaft 104 of the drive adaptor 102 from the damper sleeve 174, removing the sheared or damaged circumferential damper members 118 and/or damper sleeve 174 from the drive adaptor 102, positioning a replacement damper sleeve 174 and/or circumferential damper members 118 on the drive adaptor 102, and re-inserting the adaptor shaft 104 of the drive adaptor 102 in the damper sleeve 174.

Figure 33:
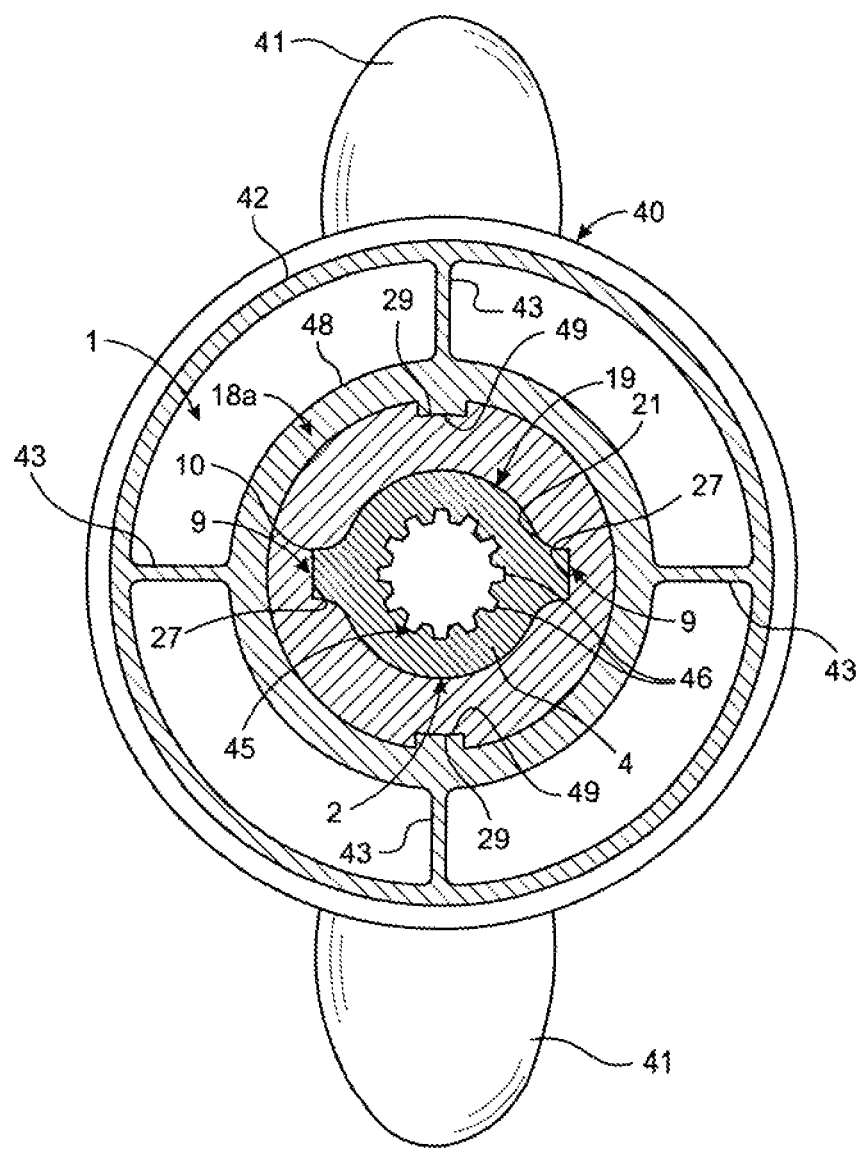
FIG. 33 is a cross-sectional view, taken along section lines 8-8 in FIG. 2B, of another alternative illustrative embodiment of the damper assemblies in the assembled state inside the propeller drive hub sleeve of the marine propeller, with the adaptor lugs on the adaptor shaft of the drive adaptor out-of-phase with respect to each other (in this case, 180 degrees) and with respect to the respective adaptor lug notches in at least one circumferential damper member of the damper assembly to preload the circumferential damper member of the damper assembly in the relaxed configuration thereof.

Referring next to FIG. 33 of the drawings, in some embodiments of the damper assemblies, the adaptor lugs 9 on the adaptor shaft 4 of the drive adaptor 2 may be disposed out-of-phase with respect to each other (such as less than 180 degrees, for example and without limitation, as illustrated) and with respect to the respective adaptor lug notches in at least one circumferential damper member 18a of the damper assembly 1. The interfacing adaptor lug notches 27 in at least one circumferential damper member 18a in the damper assembly 1 may be disposed in-phase with each other (such as 180 degrees, for example and without limitation, as illustrated). The out-of-phase adaptor lugs 9 may preload at least one of the circumferential damper members 18a in the relaxed configuration thereof. Accordingly, the dampening and shear capabilities of the pre-loaded circumferential damper member or members 18a in the damper assembly 1 may be higher than those of the circumferential damper member or members 18a which are not pre-loaded.

In this way, the dampening and shear capabilities of the damper assembly 1 may be highly customizable to fit a particular application.

Figure 34:
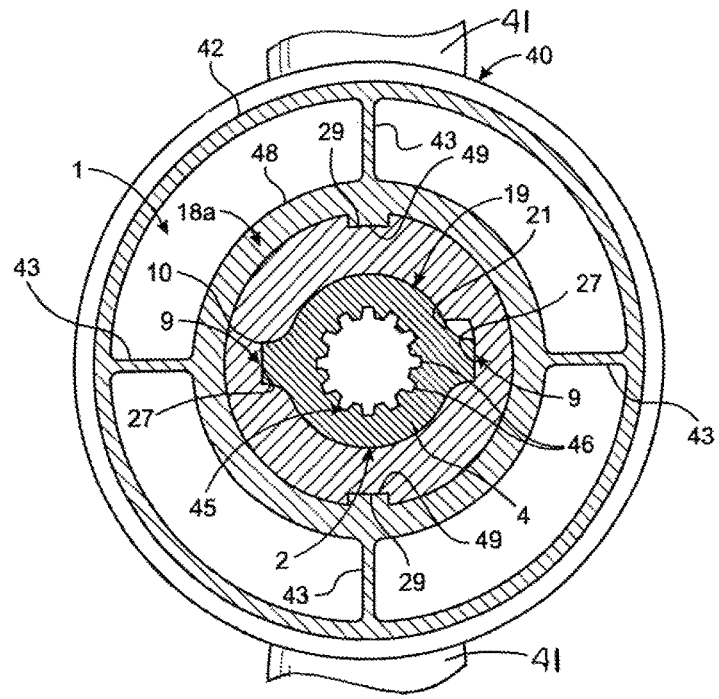
FIG. 34 is a cross-sectional view of still another alternative illustrative embodiment of the damper assemblies inside the propeller drive hub sleeve of the marine propeller, with the adaptor lug notches in at least one of the circumferential damper members of the assembly out-of-phase with respect to each other (in this case, less than 180 degrees) and with respect to the adaptor lugs on the adaptor shaft of the drive adaptor to preload the circumferential damper member in a first direction in the relaxed configuration thereof.
Figure 35:
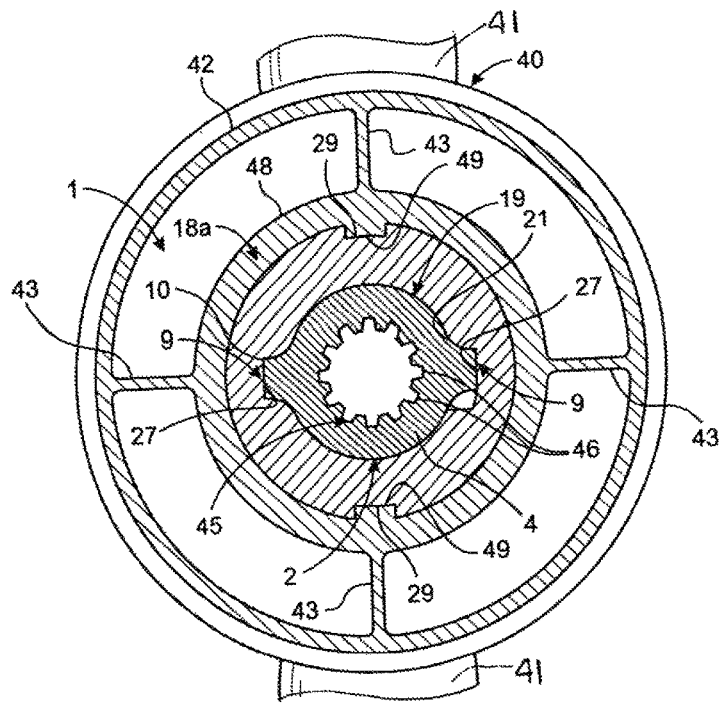
FIG. 35 is a cross-sectional view of yet another alternative illustrative embodiment of the damper assemblies inside the propeller drive hub sleeve of the marine propeller, with the adaptor lug notches in at least one of the circumferential damper members of the assembly out-of-phase with respect to each other (in this case, less than 180 degrees) and with respect to the adaptor lugs on the adaptor shaft of the drive adaptor to preload the circumferential damper member in a second direction in the relaxed configuration thereof.

Referring next to FIGS. 34 and 35 of the drawings, in some embodiments, the adaptor lug notches 27 in at least one of the circumferential damper members 18*a* of the damper assembly 1 may be disposed out-of-phase with respect to each other (in this case less than 180 degrees) and with respect to the adaptor lugs 9 on the adaptor shaft 4 of the drive adaptor 2 to preload the circumferential damper member 18*a* in a first circumferential direction (FIG. 34) or a second circumferential direction (FIG. 35) in the relaxed configuration of the damper assembly 1. Accordingly, the dampening and shear capabilities of the pre-loaded circumferential damper member or members 18*a* in the damper assembly 1 may be higher than those of the circumferential damper member or members 18*a* which are not pre-loaded. In this way, the dampening and shear capabilities of the damper assembly 1 may be highly customizable to fit a particular application. It will be appreciated by those skilled in the art that any number of the pre-loaded circumferential damper members 18*a* may be placed in the damper assembly 1 in any desired combination to customize the dampening and shear capabilities or characteristics of the damper assembly 1. For example and without limitation, in some applications, 4 circumferential damper members 18*a* may be preloaded in the first direction (FIG. 34) and 4 circumferential damper members 18*a* may be preloaded in the second direction (FIG. 35). Numerous other combinations are also possible.

Figure 36:
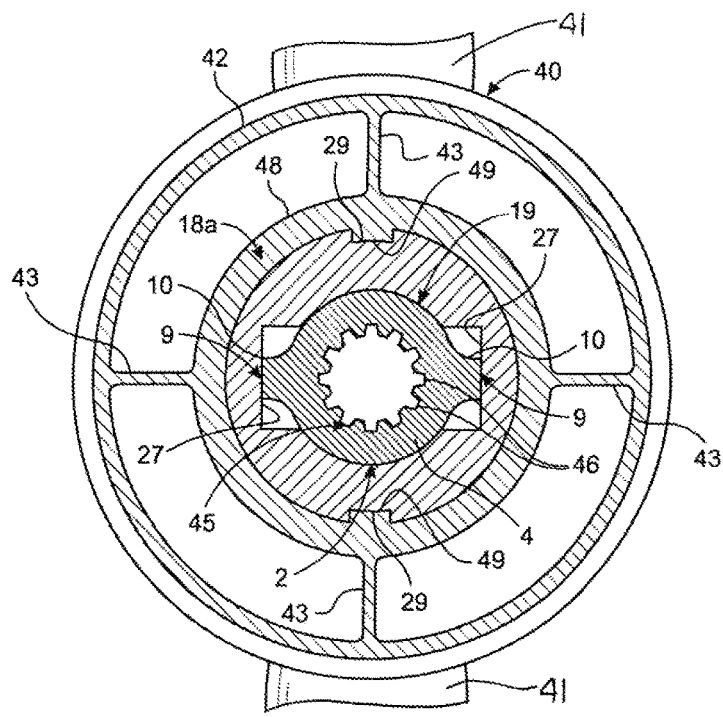
FIG. 36 is a cross-sectional view of another illustrative embodiment of the damper assemblies in the propeller drive hub sleeve of the marine propeller with the adaptor lug notches in at least one of the circumferential damper members of the assembly each having a width sufficient to facilitate travel of the respective adaptor lugs on the drive adaptor through a travel arc in the respective adaptor lug notches before engagement of the adaptor lugs with the circumferential damper member.
Figure 37:
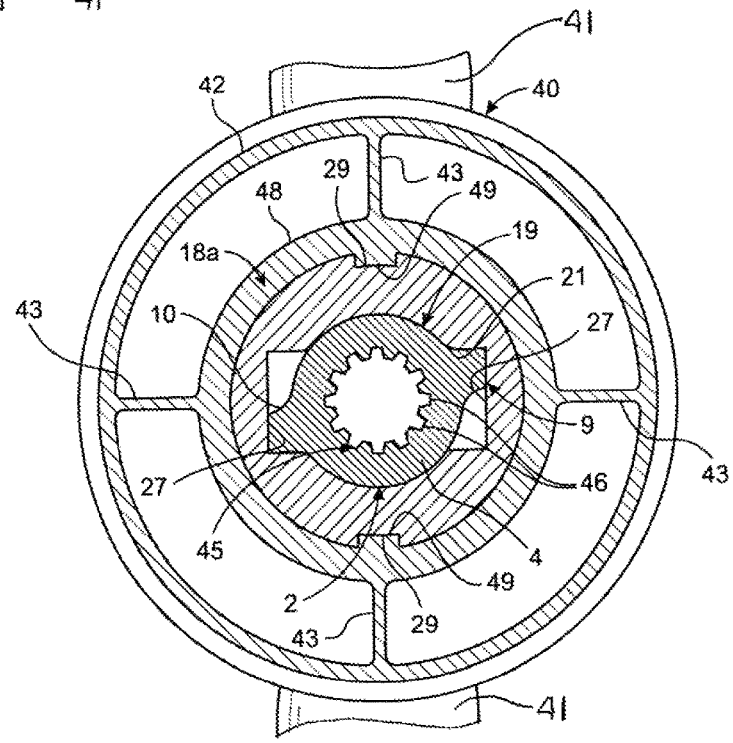
FIG. 37 is a cross-sectional view of the damper assembly as illustrated in FIG. 36, with the adaptor lugs on the drive adaptor engaging the circumferential damper member at the respective adaptor lug notches.

Referring next to FIGS. 36 and 37 of the drawings, in some embodiments, the adaptor lug notches 27 in at least one of the circumferential damper members 18*a* of the assembly 1 may each have a width which is sufficient to facilitate travel of the respective adaptor lugs 9 on the drive adaptor 2 through a travel arc in the respective adaptor lug notches 27 before engagement of the adaptor lugs 27 with the circumferential damper member 18*a*. Accordingly, the circumferential damper members 18*a* having the relatively wider adaptor lug notches 27 may "kick in" or become engaged later in the compression cycle than those circumferential damper members 18*a* having the narrower adaptor lug notches 27. In this manner, various combinations of circumferential damper members 18*a* having the wider adaptor lug notches 27 and the narrower adaptor lug notches 27 may facilitate staged compression and engagement of the adaptor lug notches 27 with the circumferential damper members 18*a* throughout the power phase of the propeller drive shaft 45.

It will be appreciated by those skilled in the art that the various embodiments of damper assemblies 1 of the disclosure may be combined with each other to impart highly customizable dampening and shear capabilities to the damper assemblies 1. For example and without limitation, one or more of the circumferential damper members 18*a* which were heretofore described with respect to the damper assembly 1 in FIGS. 10A-11B can be combined with one or more of the circumferential damper members 18*b* which were heretofore described with respect to the damper assembly 1*b* in FIGS. 13A-13E. Moreover, circumferential damper members having different materials and durometers can be mixed to achieve different degrees or magnitudes of preload in the damper assembly 1. The circumferential damper members may be replaceable in each damper assembly to provide a recyclable damper assembly.

While the preferred embodiments of the invention have been described above, it will be recognized and understood that various modifications may be made in the invention and the appended claims are intended to cover all such modifications which may fall within the spirit and scope of the invention.

What is claimed is:

1. A marine propeller, comprising:
  a damper assembly suitable for driving engagement by a propeller drive shaft, the damper assembly including:
    a propeller hub including a propeller hub drive sleeve;
    a plurality of propeller blades extending from the propeller hub;
    a drive adaptor configured for coupling to the propeller drive shaft, the drive adaptor including an adaptor shaft disposed in the propeller hub drive sleeve of the propeller hub;
    at least one circumferential damper member circumferentially extending continuously and completely around the adaptor shaft of the drive adaptor, the at least one circumferential damper member drivingly engaged for rotation by the adaptor shaft of the drive adaptor and drivingly engaging the propeller hub drive sleeve of the propeller hub for rotation; and
    at least one deformation space adjacent to the at least one circumferential damper member, the at least one deformation space at least partially coinciding in circumference with the at least one circumferential damper member.

2. The marine propeller of claim 1 wherein the at least one circumferential damper member comprises a continuous, annular, toroid-shaped circumferential damper member body having a damper opening receiving the adaptor shaft of the drive adaptor.

3. The marine propeller of claim 2 further comprising at least one adaptor lug on the adaptor shaft of the drive adaptor and at least one internal adaptor lug notch in the circumferential damper member body, the at least one internal adaptor lug notch receiving the at least one adaptor lug, respectively.

4. The marine propeller of claim 2 further comprising at least one propeller torque transfer lug on the propeller hub drive sleeve of the propeller hub and at least one external transfer lug notch extending into the circumferential damper member body, the at least one external transfer lug notch receiving the at least one propeller torque transfer lug, respectively.

5. The marine propeller of claim 2 further comprising a pair of spaced-apart internal adaptor lug notches extending into the circumferential damper member body and a pair of spaced-apart external transfer lug notches extending into the circumferential damper member body in 90-degree relationship with the pair of spaced-apart internal adaptor lug notches, respectively.

6. The marine propeller of claim 1 further comprising at least one elongated, rod-shaped, longitudinal damper member extending in parallel relationship with respect to a longitudinal axis of the adaptor shaft of the drive adaptor adjacent to the at least one circumferential damper member, and wherein the at least one deformation space is formed by and between the at least one circumferential damper member and the at least one elongated, rod-shaped, longitudinal damper member.

7. The marine propeller of claim 6 wherein the at least one circumferential damper member comprises a pair of spaced-apart circumferential damper members extending continuously around the adaptor shaft of the drive adaptor, and wherein the at least one elongated, rod-shaped, longitudinal damper member extends between the pair of spaced-apart circumferential damper members, and the at least one deformation space comprises a pair of deformation spaces formed by and between each of the pair of spaced-apart circumferential damper members and each corresponding one of the at least one elongated, rod-shaped, longitudinal damper member.

8. The marine propeller of claim 7 further comprising at least one propeller torque transfer lug on the propeller hub drive sleeve of the propeller hub; and wherein the at least one elongated, rod-shaped, longitudinal damper member comprises a plurality of elongated, rod-shaped, longitudinal damper members extending between the pair of spaced-apart circumferential damper members, and further comprising at least one transfer lug space formed by and between adjacent ones of the plurality of elongated, rod-shaped, longitudinal damper members, and wherein the at least one transfer lug space receives the at least one propeller torque transfer lug, respectively.

9. The marine propeller of claim 1 wherein the at least one circumferential damper member comprises a cylindrical circumferential damper member body having a pair of spaced-apart, annular, parallel inner damper edges, a pair of spaced-apart, annular, parallel outer damper edges, an inner damper surface extending between the inner damper edges and an outer damper surface extending between the outer damper edges.

10. The marine propeller of claim 9 wherein at least one of each of the pair of spaced-apart, annular, parallel inner damper edges and at least one of the pair of spaced-apart, annular, parallel outer damper edges is truncated.

11. The marine propeller of claim 1 wherein the at least one circumferential damper member comprises a circumferential damper member body having a polygonal cross-section.

12. The marine propeller of claim 11 wherein the circumferential damper member body has an octagonal cross-section.

13. The marine propeller of claim 1 wherein the at least one circumferential damper member comprises a continuous, annular, toroid-shaped circumferential damper member body having a damper opening receiving the adaptor shaft of the drive adaptor, a convex outer damper surface, a convex inner damper surface opposite the convex outer damper surface and facing the damper opening and at least one flat external surface in the convex outer damper surface.

14. The marine propeller of claim 13 further comprising a pair of spaced-apart internal adaptor lug notches extending into the convex inner damper surface of the circumferential damper member body and a pair of spaced-apart external transfer lug notches extending into the convex outer damper surface of the circumferential damper member body in 90-degree relationship with the pair of spaced-apart internal adaptor lug notches, respectively; and wherein the at least one flat external surface comprises at least one flat external surface in each portion of the convex outer damper surface extending between each corresponding one of the pair of spaced-apart external transfer lug notches and each corresponding adjacent one of the pair of spaced-apart internal adaptor lug notches.

15. The marine propeller of claim 1 wherein the at least one circumferential damper member comprises a continuous, annular, toroid-shaped circumferential damper member body having a damper opening receiving the adaptor shaft of the drive adaptor; a convex outer damper surface; a convex inner damper surface opposite the convex outer damper surface and facing the damper opening; a convex fore damper surface; a convex aft damper surface; at least one arcuate flat fore damper surface alternating with at least one arcuate convex fore damper surface in the convex fore damper surface; and at least one arcuate flat outer damper surface alternating with at least one arcuate convex outer damper surface in the convex outer damper surface.

16. A marine propeller, comprising:
a damper assembly suitable for driving engagement by a propeller drive shaft, the damper assembly including:
a propeller hub including a propeller hub drive sleeve;
at least one propeller torque transfer lug extending from the propeller hub drive sleeve;
a plurality of propeller blades extending from the propeller hub;
a drive adaptor configured for coupling to the propeller drive shaft, the drive adaptor including:
an adaptor base;
an adaptor shaft extending from the adaptor base, the adaptor shaft disposed in the propeller hub drive sleeve of the propeller hub;
at least one adaptor lug extending from the adaptor shaft in spaced-apart, consequent relationship to the at least one propeller torque transfer lug, respectively; and
at least one adjustable drive stop lug on the adaptor base between the at least one propeller torque transfer lug and the at least one adaptor lug, the at least one adjustable drive stop lug adjustable in position with respect to the at least one propeller torque transfer lug and the at least one adaptor lug:
at least one circumferential damper member circumferentially extending continuously and completely around the adaptor shaft of the drive adaptor, the at least one circumferential damper member drivingly engaged for rotation by the adaptor shaft of the drive adaptor and drivingly engaging the propeller hub drive sleeve of the propeller hub for rotation; and
at least one deformation space adjacent to the at least one circumferential damper member, the at least one deformation space at least partially coinciding in circumference with the at least one circumferential damper member.

17. The marine propeller of claim 16 further comprising at least one set of a plurality of stop lug fastener openings in the adaptor base and a stop lug fastener extending through a selected one of the plurality of stop lug fastener openings and engaging the at least one adjustable drive stop lug.

18. The marine propeller of claim 17 further comprising at least one stop lug fastener cavity in the adaptor base of the drive adaptor, and wherein the plurality of stop lug fastener openings and the stop lug fastener register with the at least one stop lug fastener cavity.

19. The marine propeller of claim 18 wherein the at least one propeller torque transfer lug comprises a plurality of propeller torque transfer lugs, the at least one adaptor lug comprises a plurality of adaptor lugs and the at least one set of the plurality of stop lug fastener openings comprises a plurality of sets of the plurality of stop lug fastener openings, each of the plurality of sets of the plurality of stop lug fastener openings disposed between each of the plurality of propeller torque transfer lugs and each corresponding consequent one of the plurality of adaptor lugs.

20. A marine propeller, comprising:
a damper assembly suitable for driving engagement by a propeller drive shaft, the damper assembly including:
a propeller hub including a propeller hub drive sleeve;
a plurality of propeller blades extending from the propeller hub;

a drive adaptor configured for coupling to the propeller drive shaft, the drive adaptor including:
  an adaptor shaft disposed in the propeller hub drive sleeve of the propeller hub; and
  a damper sleeve drivingly engaged for rotation by the adaptor shaft of the drive adaptor;
at least one circumferential damper member circumferentially extending continuously and completely around the damper sleeve, the at least one circumferential damper member drivingly engaged for rotation by the damper sleeve and drivingly engaging the propeller hub drive sleeve of the propeller hub for rotation; and
at least one deformation space adjacent to the at least one circumferential damper member, the at least one deformation space at least partially coinciding in circumference with the at least one circumferential damper member.

21. The marine propeller of claim 20 wherein the at least one circumferential damper member comprises a circumferential damper member body having a fore damper surface, an aft damper surface and a damper opening extending from the fore damper surface to the aft damper surface, the damper opening receiving the damper sleeve.

22. The marine propeller of claim 21 further comprising a plurality of flat outer damper surfaces and a plurality of convex inner damper surfaces opposite the plurality of flat outer damper surfaces, respectively, the plurality of convex inner damper surfaces engaging the damper sleeve.

23. The marine propeller of claim 22 wherein the plurality of flat outer damper surfaces merge into a plurality of rounded damper shoulders extending between adjacent ones of the plurality of flat outer damper surfaces, and further comprising a plurality of lug cavities between the plurality of convex inner damper surfaces and communicating with the damper opening.

24. The marine propeller of claim 22 further comprising a plurality of convex outer sleeve surfaces on the damper sleeve and a plurality of interfaces formed between the plurality of convex inner damper surfaces of the circumferential damper member body and the plurality of convex outer sleeve surfaces, respectively, of the damper sleeve.

25. The marine propeller of claim 24 wherein each of the plurality of interfaces has a curved or irregular shape.

26. A marine propeller, comprising:
a damper assembly suitable for driving engagement by a propeller drive shaft, the damper assembly including:
  a propeller hub including a propeller hub drive sleeve;
  at least one propeller torque transfer lug extending from the propeller hub drive sleeve;
  a plurality of propeller blades extending from the propeller hub;
  a drive adaptor configured for coupling to the propeller drive shaft, the drive adaptor including:
    an adaptor shaft disposed in the propeller hub drive sleeve of the propeller hub; and
    a plurality of spaced-apart adaptor lugs extending from the adaptor shaft, the plurality of adaptor lugs disposed out-of-phase with respect to each other;
  at least one circumferential damper member circumferentially extending continuously and completely around the adaptor shaft of the drive adaptor, the at least one circumferential damper member drivingly engaged for rotation by the adaptor shaft of the drive adaptor and drivingly engaging the propeller hub drive sleeve of the propeller hub for rotation;
  a plurality of adaptor lug notches in the at least one circumferential damper member and receiving the plurality of adaptor lugs, respectively, on the adaptor shaft of the drive adaptor, the plurality of adaptor lug notches disposed in-phase with respect to each other, whereby at least one of the plurality of adaptor lugs preloads the at least one circumferential damper member in a relaxed configuration of the at least one circumferential damper member; and
  at least one deformation space adjacent to the at least one circumferential damper member, the at least one deformation space at least partially coinciding in circumference with the at least one circumferential damper member.

27. The marine propeller of claim 26 wherein the plurality of adaptor lugs are disposed at less than 180 degrees with respect to each other.

28. A marine propeller, comprising:
a damper assembly suitable for driving engagement by a propeller drive shaft, the damper assembly including:
  a propeller hub including a propeller hub drive sleeve;
  at least one propeller torque transfer lug extending from the propeller hub drive sleeve;
  a plurality of propeller blades extending from the propeller hub;
  a drive adaptor configured for coupling to the propeller drive shaft, the drive adaptor including:
    an adaptor shaft disposed in the propeller hub drive sleeve of the propeller hub; and
    a plurality of spaced-apart adaptor lugs extending from the adaptor shaft;
  at least one circumferential damper member circumferentially extending continuously and completely around the adaptor shaft of the drive adaptor, the at least one circumferential damper member drivingly engaged for rotation by the adaptor shaft of the drive adaptor and drivingly engaging the propeller hub drive sleeve of the propeller hub for rotation;
  a plurality of adaptor lug notches in the at least one circumferential damper member and receiving the plurality of adaptor lugs, respectively, on the adaptor shaft of the drive adaptor, the plurality of adaptor lug notches disposed out-of-phase with respect to the plurality of spaced-apart adaptor lugs, whereby at least one of the plurality of adaptor lugs preloads the at least one circumferential damper member in a relaxed configuration of the at least one circumferential damper member; and
  at least one deformation space adjacent to the at least one circumferential damper member, the at least one deformation space at least partially coinciding in circumference with the at least one circumferential damper member.

29. The marine propeller of claim 28 wherein the plurality of adaptor lugs are disposed out-of-phase with respect to each other.

30. The marine propeller of claim 28 wherein the plurality of adaptor lug notches are disposed out-of-phase with respect to each other.

31. A marine propeller, comprising:
a damper assembly suitable for driving engagement by a propeller drive shaft, the damper assembly including:
  a propeller hub including a propeller hub drive sleeve;
  at least one propeller torque transfer lug extending from the propeller hub drive sleeve; and
  a plurality of propeller blades extending from the propeller hub;

a drive adaptor configured for coupling to the propeller drive shaft, the drive adaptor including:
   an adaptor shaft disposed in the propeller hub drive sleeve of the propeller hub; and
   at least one adaptor lug extending from the adaptor shaft;
at least one circumferential damper member circumferentially extending continuously and completely around the adaptor shaft of the drive adaptor, the at least one circumferential damper member drivingly engaged for rotation by the adaptor shaft of the drive adaptor and drivingly engaging the propeller hub drive sleeve of the propeller hub for rotation;
at least one adaptor lug notch in the at least one circumferential damper member and receiving the at least one adaptor lug, respectively, on the adaptor shaft of the drive adaptor, the at least one adaptor lug notch having a width sufficient to facilitate travel of the at least one adaptor lug on the adaptor shaft of the drive adaptor through a travel arc in the at least one adaptor lug notch before engagement of the at least one adaptor lug with the at least one circumferential damper member; and
at least one deformation space adjacent to the at least one circumferential damper member, the at least one deformation space at least partially coinciding in circumference with the at least one circumferential damper member.

* * * * *